United States Patent
Pooja et al.

(10) Patent No.: US 10,929,684 B2
(45) Date of Patent: Feb. 23, 2021

(54) INTELLIGENTLY GENERATING DIGITAL NOTE COMPILATIONS FROM DIGITAL VIDEO

(71) Applicant: Adobe Inc., San Jose, CA (US)

(72) Inventors: Pooja, Mathura (IN); Sourabh Gupta, Noida (IN); Ajay Bedi, Hamirpur (IN)

(73) Assignee: ADOBE INC., San Jose, CA (US)

( * ) Notice: Subject to any disclaimer, the term of this patent is extended or adjusted under 35 U.S.C. 154(b) by 20 days.

(21) Appl. No.: 16/415,374

(22) Filed: May 17, 2019

(65) Prior Publication Data
US 2020/0364463 A1    Nov. 19, 2020

(51) Int. Cl.
| | |
|---|---|
| *G06K 9/00* | (2006.01) |
| *G06F 16/34* | (2019.01) |
| *G06K 9/34* | (2006.01) |
| *G06T 7/13* | (2017.01) |

(52) U.S. Cl.
CPC ....... *G06K 9/00751* (2013.01); *G06F 16/345* (2019.01); *G06K 9/00765* (2013.01); *G06K 9/344* (2013.01); *G06T 7/13* (2017.01); *G06K 2209/01* (2013.01)

(58) Field of Classification Search
CPC .......... G06K 9/00751; G06K 9/00765; G06K 9/344; G06T 7/13; G06F 16/345
See application file for complete search history.

(56) References Cited

U.S. PATENT DOCUMENTS

| | | | | |
|---|---|---|---|---|
| 2002/0055788 | A1* | 5/2002 | Petrie | H04L 67/14 700/2 |
| 2004/0261027 | A1* | 12/2004 | Dillon | H04N 21/8405 715/723 |
| 2006/0170954 | A1* | 8/2006 | Leyvi | G06F 3/14 358/1.15 |

(Continued)

OTHER PUBLICATIONS

Lucas and Kanade, An Iterative Image Registration Technique with an Application to Stereo Vision, International Joint Conference on Artificial Intelligence, pp. 674-679, 1981.

(Continued)

*Primary Examiner* — Mishawn N. Hunter
(74) *Attorney, Agent, or Firm* — Keller Jolley Preece

(57) ABSTRACT

The present disclosure relates to systems, non-transitory computer-readable media, and methods for intelligently merging handwritten content and digital audio from a digital video based on monitored presentation flow. In particular, the disclosed systems can apply an edge detection algorithm to intelligently detect distinct sections of the digital video and locations of handwritten content entered onto a writing surface over time. Moreover, the disclosed systems can generate a transcription of handwritten content utilizing digital audio. For instance, the disclosed systems can utilize an audio text transcript as input to an optical character recognition algorithm and auto-correct text utilizing the audio text transcript. Further, the disclosed systems can analyze short form text from handwritten script and generate long form text from audio text transcripts. The disclosed (Continued)

systems can accurately, efficiently, and flexibly generate digital summaries that reflect diagrams, handwritten text transcriptions, and audio text transcripts over different presentation time periods.

20 Claims, 10 Drawing Sheets

(56) References Cited

U.S. PATENT DOCUMENTS

| | | | |
|---|---|---|---|
| 2008/0190271 A1* | 8/2008 | Taub | G10H 1/0058 84/645 |
| 2011/0026825 A1* | 2/2011 | Chaudhuri | G06K 9/00751 382/170 |
| 2017/0300752 A1* | 10/2017 | Biswas | G11B 27/031 |
| 2017/0324572 A1* | 11/2017 | Biggs | H04L 12/1822 |
| 2019/0082236 A1* | 3/2019 | Salim | H04N 21/8405 |
| 2020/0126583 A1* | 4/2020 | Pokharel | G06F 16/41 |

OTHER PUBLICATIONS

C. Choudary and Tiecheng Liu , Summarization of Visual Content in Instructional Videos, IEEE Transactions on Multimedia, vol. 9 Issue 7, Nov. 2007, p. 1443-1455.

* cited by examiner

INTELLIGENTLY GENERATING DIGITAL NOTE COMPILATIONS FROM DIGITAL VIDEO

BACKGROUND

Recent years have seen significant improvements in hardware and software platforms for generating digital summaries of digitally captured presentations. For example, some conventional systems can generate a transcription from digital audio of a presentation and emphasize portions of the transcription (e.g., emphasize portions identified based on user input while capturing the digital audio). Similarly, some conventional systems can isolate and present frames of a digital video of a presentation. For example, these conventional systems can identify frames of a digital video and extract content from the frames to summarize visual components of a presentation. Although conventional systems can generate digital summaries, such systems have a number of problems in relation to accuracy, efficiency, and flexibility of operation.

These along with additional problems and issues exist with regard to conventional video analysis systems.

BRIEF SUMMARY

Embodiments of the present disclosure provide benefits and/or solve one or more of the foregoing or other problems in the art with systems, non-transitory computer-readable media, and computer-implemented methods for generating comprehensive digital summaries by intelligently merging handwritten content and digital audio from a digital video based on monitored presentation flow. In particular, in one or more embodiments, the disclosed systems utilize an edge detection algorithm to monitor the flow of information presented on a writing surface during a presentation. The disclosed systems can then generate a digital summary that aligns text from the writing surface, drawings from the writing surface, and text transcriptions from the digital audio over distinct time periods in an intuitive order. Furthermore, the disclosed systems can utilize the digital audio to generate a digital summary that auto-corrects handwritten content on a writing surface in the digital video. Indeed, by utilizing a text transcript of digital audio as input to an optical character recognition algorithm and/or a similarity index search approach, the disclosed systems can accurately generate a transcription of handwritten text from the writing surface. Moreover, in one or more embodiments, the disclosed systems can analyze short form text on a writing surface utilizing a text transcript of the digital audio to accurately generate long form text augmenting the short form text. In this manner, the disclosed systems can generate digital summaries that accurately reflect written and spoken content in a presentation while flexibly merging handwritten content and text transcription of digital audio in an intuitive and organized digital summary.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
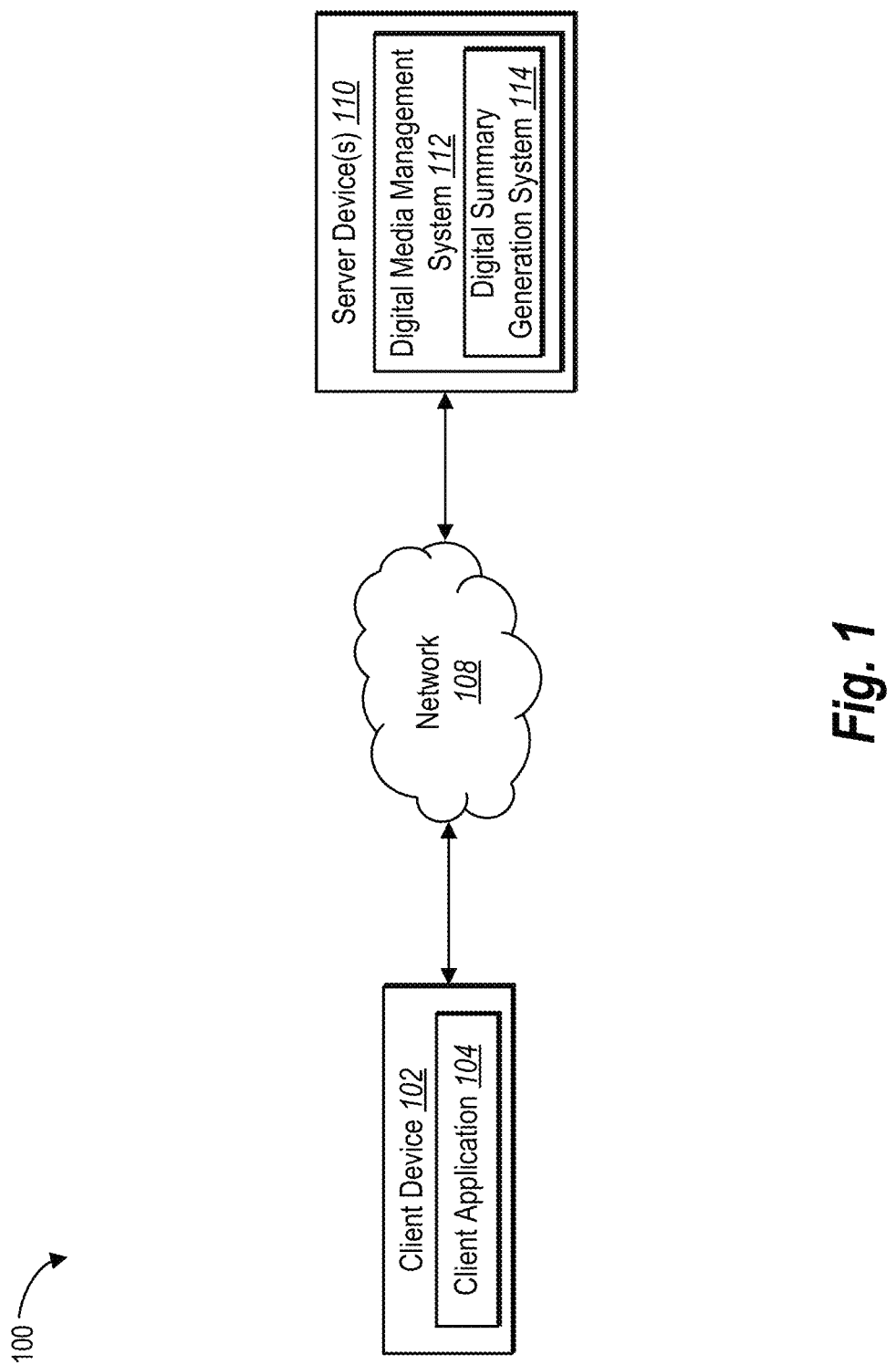
FIG. 1 illustrates a diagram of an environment in which a digital summary generation system can operate in accordance with one or more embodiments.

This disclosure describes one or more embodiments of a digital summary generation system that merges handwritten content and digital audio from a digital video based on presentation flow to generate a digital summary for a presentation portrayed in the digital video. In particular, the digital summary generation system can utilize an intelligent approach to detecting content flow in video frames for generating notes of a presentation. For example, in one or more embodiments, the digital summary generation system utilizes an edge detection algorithm to track regions of handwritten content over distinct time periods and merges the handwritten content with digital audio to generate digital summaries that intuitively outline both visual and audio content. In addition, the digital summary generation system can utilize utilizing an optical character recognition algorithm informed by a text transcript of digital audio to automatically correct handwritten content on a writing surface in a digital video. Moreover, the digital summary generation system can automatically complete short form text used by a presenter in handwritten content by augmenting the short form text using audio input. In this manner, the digital summary generation system can create digital summaries that efficiently, flexibly, and accurately blend transcriptions of digital audio with diagrams and script from handwritten content in a digital video.

To illustrate, the digital summary generation system can identify a digital video of a presentation that includes user entry of handwritten content on a writing surface over time. The digital summary generation system can track and record the flow of information on the writing surface. For example, in one or more embodiments, the digital summary generation system applies an edge detection algorithm to a frame of the digital video from a target time period to identify a location of a subpart of the writing surface where a portion of the handwritten content was entered. Furthermore, the digital summary generation system can utilize an optical character recognition algorithm and a text transcript of digital audio for the target time period to generate a transcription of the portion of the handwritten content. Then, the digital summary generation system can generate a digital summary of the presentation that includes the transcription of the portion of the handwritten content and the text transcript from the digital audio for the target time period.

As just mentioned, the digital summary generation system can track and record the flow of information on a writing surface portrayed in a digital video. For example, in some embodiments, the digital summary generation system utilizes an edge detection algorithm to monitor the location of handwritten content over time. In particular, the digital summary generation system can determine where a presenter enters, modifies, or removes handwritten content over time by identifying the location of edge features for different frames of a digital video. The digital summary generation system can record these locations in conjunction with time information of the digital video to generate an index of handwritten content location over time.

The digital summary generation system can also determine distinct sections (e.g., target time periods) to summarize separately. For instance, in some embodiments, the digital summary generation system captures representative frames that include content for distinct sections. For example, by detecting when edge features decrease by a threshold amount (indicating that the presenter is erasing information) or detecting additional edge features in a new region (indicating movement to a different portion of a writing surface), the digital summary generation system can capture and store representative frames that portray content for distinct portions of a presentation. By compiling a set of representative frames, the digital summary generation system can efficiently capture content generated on the writing surface for distinct target time periods and then compile a digital summary from the representative frames.

For example, upon recording the flow of information and identifying representative frames, the digital summary generation system can extract and merge visual and audio data. To illustrate, the digital summary generation system can determine locations of handwritten content and audio ranges corresponding to a target time period. The digital summary generation system can generate a text transcript of the digital audio corresponding to the target time period. Moreover, the digital summary generation system can identify a portion of the handwritten content entered on the writing surface during the target time period (from the representative frame) and generate a transcription of the portion of handwritten content. The digital summary generation system can merge the text transcript of the digital audio and the transcription of the portion of the handwritten content to generate a digital summary for the target time period.

As mentioned above, the digital summary generation system can utilize a text transcript of digital audio to more accurately decipher handwritten content from the digital video. For example, in some embodiments, the digital summary generation system utilizes an optical character recognition algorithm to generate a transcription of handwritten script from a portion of handwritten content for a target time period. The digital summary generation system can generate a text transcript of digital audio for the target time period and utilize the text transcript to improve the accuracy of the optical character recognition algorithm. Specifically, the digital summary generation system can provide the text transcript of the digital audio in an OCR library utilized by the optical character recognition algorithm to generate a transcription of handwritten script. Moreover, the digital summary generation system can utilize a similarity index search approach to search a map of words from the digital audio and auto-correct word outputs from the optical character recognition based on the audio text transcript.

As discussed above, the digital summary generation system can also utilize the digital audio to generate long form text from short form handwritten script. For example, in some circumstances presenters provide handwritten content that includes abbreviations, acronyms, or truncated terms (e.g., short form text). The digital summary generation system can search a text transcript of the digital audio based on handwritten script and compare the handwritten script with the text transcript of the digital audio to identify long form text. The digital summary generation system can then utilize the long form text in a digital summary (e.g., to elaborate or supplement the short form text).

In addition to generating more accurate transcription of handwritten script portrayed on a writing surface, the digital summary generation system can also generate digital summaries from diagrams that include non-textual content. Indeed, the digital summary generation system can utilize an optical character recognition algorithm and a representative frame to identify non-textual content entered during a target time period. Utilizing location information for the handwritten content, the digital summary generation system can generate a cropped image of the diagram. The digital summary generation system can then generate a digital summary by merging a text transcript of the digital audio with the digital image portraying the diagram.

The digital summary generation system can further improve accuracy by detecting and calibrating the writing surface (or other objects) portrayed in the digital video. In particular, the digital summary generation system can utilize a machine learning model (e.g., a convolutional neural network) to identify the writing surface from the digital video as distinct from other areas of the digital video. Further, by identifying movement of other features in the digital video, the digital summary generation system can disregard non-writing surface objects when generating the digital summary.

As mentioned above, conventional systems have a number of problems in relation to accuracy, efficiency, and flexibility. For instance, conventional systems that generate a transcription from digital audio can provide words spoken during a presentation but do not accurately capture visual representations. Similarly, conventional systems that capture digital frames of a digital video fail to accurately capture spoken concepts and often generate inaccurate visual representations. For instance, conventional systems that capture and extract content from frames of a digital video often generate visual representations of written text that are inaccurate and difficult to understand (e.g., provide text that is not decipherable, not actually present in handwritten text, or abbreviations that a reader cannot understand). In addition, in presentations with written text inter-mingled with drawings on a writing surface, conventional systems often fail to accurately identify or summarize contents of the writing surface.

In addition to accuracy concerns, conventional systems are also inefficient. Indeed, in generating a digital summary, conventional systems often require excessive user input and computational resources. For example, conventional systems can require user input to identify significant portions of a digital presentation. Similarly, conventional systems often require significant user input, time, and resources to revise and correct inaccuracies in digital summaries.

In addition, conventional systems also lack flexibility. For example, conventional systems often generate digital summaries with rigid digital content (e.g., a digital audio transcription) regardless of the type or order of content shared in the presentation. Similarly, conventional system cannot identify and incorporate various textual and non-textual elements of a writing surface captured in a digital video. Additionally, text on writing surfaces in digital videos is often presented in a fluid manner that conventional systems cannot flexibly capture. For example, in a classroom setting, it is common for an instructor to fluidly transition across different portions of a writing surface, erase material from the writing surface, and return to visual representations previously discussed earlier in a presentation. Conventional systems that rigidly generate and extract content from frames of a digital video, often present information from such a presentation in a counter-intuitive and inaccurate manner.

The digital summary generation system provides many advantages and benefits over conventional systems and methods. For example, the digital summary generation system can improve accuracy relative to conventional systems. Indeed, by actively monitoring flow of handwritten content over the course of a presentation and identifying distinct sections, the digital summary generation system can generate digital summaries that accurately merge visual and audio content into an ordered, comprehensive summary. Moreover, the digital summary generation system can utilize digital text of digital audio in conjunction with an optical character recognition algorithm to generate accurate transcriptions of handwritten script on a writing surface.

In addition, the digital summary generation system can improve efficiency relative to conventional systems. For example, the digital summary generation system can automatically merge diagrams, handwritten script, and digital audio in an ordered manner based on monitored presentation flow. Accordingly, the digital summary generation system can significantly reduce the user interactions, time, and computer resources required to generate and revise digital summaries from presentations.

Furthermore, the digital summary generation system can increase flexibility. For example, the digital summary generation system flexibly merge digital audio, handwritten drawings, and handwritten script throughout a presentation. Thus, depending on the particular content of each individual presentation, the digital summary generation system can generate a dynamic digital summary that interweaves different content forms. In addition, the digital summary generation system can generate digital summaries with a logical flow that tracks the presentation portrayed in a digital video. Thus, the digital summary generation system can track and organize digital summaries that reflect additions and deletions of handwritten content.

As illustrated by the foregoing discussion, the present disclosure utilizes a variety of terms to describe features and advantages of the digital summary generation system. Additional detail is now provided regarding the meaning of such terms. For example, as used herein, the term "digital video" refers to digital data representative of a sequence of visual images. In particular, a digital video includes a sequence of images with corresponding digital audio. For example, a digital video may refer to a digital file having one of the following file extensions: AVI, FLV, WMV, MOV, MP4. Similarly, as used herein, the term "frame" (or "frame of a digital video") refers to a digital image from a digital video. Moreover, the term "digital audio" refers to digital data representative of a sound. In particular, a digital audio of a presentation can include the recorded sound from a digital video in any of a variety of file formats.

As mentioned above, a digital video can portray a presentation. In particular, a digital video portraying a presentation can include a digital video illustrating a writing surface and accompanying digital audio (e.g., digital audio reflecting the voice of a presenter). To illustrate, a digital video of a presentation can include recording of a lecture, address, symposium, or classroom discussion.

Additionally, as used herein, the term "handwritten content" refers to content (e.g., text and/or pictures) entered on a writing surface. In particular, the term "handwritten content" can include text or diagrams entered by a presenter/user onto a writing surface portrayed in a digital video. To illustrate, handwritten content can include lecture notes on a white board, notations on a presentation poster, equations on a chalkboard, and/or diagrams on an overhead projector.

Further, as used herein, the term "writing surface" refers to any object that can portray content (e.g., handwritten content). In particular, the term "writing surface" can include a bounded rectangle (or other shape) in a digital video of a presentation on which a user enters and/or removes information. To illustrate, a writing surface can include a chalk board, white board, overhead projection, digital projection, and/or poster.

Also, as used herein, the term "edge detection algorithm" refers to a computer algorithm that identifies edges (e.g., abrupt changes or gradients in image brightness). In particular, the term "edge detection algorithm" can include a computer algorithm that identifies edges of handwritten text on a writing surface. For example, an edge detection algorithm can identify edge features and utilize the edge features to predict edges within a writing surface of a digital video. An edge detection algorithm can include canny edge detector. As used herein, the term "edge feature" refers to characteristics of a digital image indicating one or more edges. For example, edge features can include variations in brightness or strong gradients within a digital image that indicate an edge (e.g., a line segment).

As discussed, the digital summary generation system can identify representative frames from a digital video. As used herein, a "representative frame" refers to a subset of frames from a digital video that portray content from a plurality of frames. In particular, a representative frame can include a frame that portrays handwritten content entered in a region of a writing surface (as portrayed in a plurality of preceding frames of a digital video). For example, a representative frame can include a frame that illustrates handwritten content entered in a target time period preceding the representative frame (e.g., a representative frame illustrates content added in the preceding ten seconds before an instructor erases a portion of a writing surface). As described below, the digital summary generation system can determine representative frames by monitoring changes in edge features across frames of a digital video.

Further, as used herein, the term "optical character recognition algorithm" refers to a computer algorithm that identifies characters and/or words from handwritten and/or printed text. In particular, the term "optical character recognition algorithm" can include a computer algorithm for converting handwritten content into digital text. An optical character recognition can utilize an OCR library (e.g., a library of words to search for and/or emphasize) in converting handwritten content into digital text. Also, as used herein, the term "text characters" refers to any letter, number, or other textual symbol. In particular, the term "text characters" can include a standardized text character, such as a Unicode character.

Additionally, as used herein, the term "drawing" refers to a visual representation that includes non-textual characters. In particular, the term "drawing" can include charts, graphs, pictures, illustrations, diagrams and/or tables on a writing surface. To illustrate, a drawing can include any picture or diagram drawn with a writing implement such as a marker, pen, or pencil on a writing surface.

Also, as used herein, the term "digital summary of a presentation" refers to digital document that includes content corresponding to a presentation. In particular, the term "digital summary of the presentation" can include a digital document that summarizes a presentation portrayed in a digital video. To illustrate, a digital summary of the presentation can include digital notes or a digital outline of a presentation.

Further, as used herein, the term "digital image" refers to refers to any digital symbol, picture, icon, or illustration. For example, the term "digital image" includes digital files with the following, or other, file extensions: JPG, TIFF, BMP, PNG, RAW, or PDF. The term "digital image" also includes one or more images or cropped portions of images (e.g., frames) in a digital video.

Additionally, as used herein, the term "text transcript from digital audio" (or "audio text transcript") refers to a printed representation of digital audio. In particular, text transcript from the digital audio can include digital text reflecting spoken word from the digital audio of a digital video.

Also, as used herein, the term "transcription of handwritten content" (or "handwritten text transcription") refers to any printed representation of handwritten content. In particular, a transcription of handwritten content can include digital text reflecting handwritten content from a writing surface in a digital video. To illustrate, the digital summary generation system can generate a transcription of handwritten content by utilizing an optical character recognition algorithm to generate text characters (e.g., standardized text characters, such as Unicode text) from the handwritten content.

Further, as used herein, the term "short form text" refers to a shortened form of a word or phrase. In particular, the term "short form text" can include an abbreviation, acronym, initialism, or truncated form of a word or phrase. Also, as used herein, the term "long form text" refers to a complete word or phrase corresponding to short form text (e.g., complete words that an acronym represents).

Additional detail will now be provided regarding the digital summary generation system in relation to illustrative figures portraying exemplary embodiments. In particular, FIG. 1 illustrates an environment 100 for implementing a digital summary generation system 114 in accordance with one or more embodiments. As illustrated in FIG. 1, the environment 100 includes a client device 102, including a client application 104. The client device 102 communicates, via the network 108, with the server device(s) 110. The server device(s) 110 include a digital media management system 112, which in turn includes the digital summary generation system 114.

Although FIG. 1 illustrates the digital summary generation system 114 implemented via the server device(s) 110, the digital summary generation system 114 can be implemented via other components. For example, the digital summary generation system 114 can be implemented in whole, or in part, by the client device 102. Similarly, the digital summary generation system 114 can be implemented via both the client device 102 and the server device(s) 110.

The client device 102 can include various types of computing devices. For example, the client device 102 can be a mobile device (e.g., a smart phone), tablet, laptop computer, desktop computer, or another type of computing device as further explained below with reference to FIG. 9. Additionally, the client application 104 can include a variety of software or hardware implementations on the client device 102. For example, the client application 104 can be an online application (e.g., a web browser), and a user at the client device 102 can enter a Uniform Resource Locator (URL) or other address directing the web browser to interact with the server device(s) 110. Alternatively, the client application 104 can be a native application developed for use on the client device 102.

Additionally, the server device(s) 110 can include one or more computing devices including those explained below with reference to FIG. 9. In some embodiments, the server device(s) 110 comprises a content server. The server device(s) 110 can also comprise an application server, a communication server, a web-hosting server, a social networking server, or a digital content campaign server.

The client device 102, the server device(s) 110, and the network 108 may communicate using any communication platforms and technologies suitable for transporting data and/or communication signals, including any known communication technologies, devices, media, and protocols supportive of data communications, examples of which are described with reference to FIG. 9.

Although not a requirement, the digital summary generation system 114 can be part of a digital media management system 112. The digital media management system 112 can gather, monitor, manage, edit, distribute, and/or analyze various media. For example, the digital media management system 112 can analyze and/or edit digital videos and/or digital images. In one or more embodiments, the digital media management system 112 can utilize the digital summary generation system 114 to generate a summary (e.g., notes or an outline) for a digital video. For example, the digital media management system 112 can obtain (e.g., from the client device 102) a digital video and provide the digital video to the digital summary generation system 114. The digital summary generation system 114 can generate a digital summary of the digital video and provide the digital video to the digital media management system 112 for distribution to the client device 102. In other embodiments, the server device(s) 110 can include a system other than the digital media management system 112, and the digital summary generation system 114 can receive digital videos via alternate means. For example, the server device(s) 110 can receive digital videos from (and provide digital summaries to) the client device 102 (via the network 108).

Figure 2:
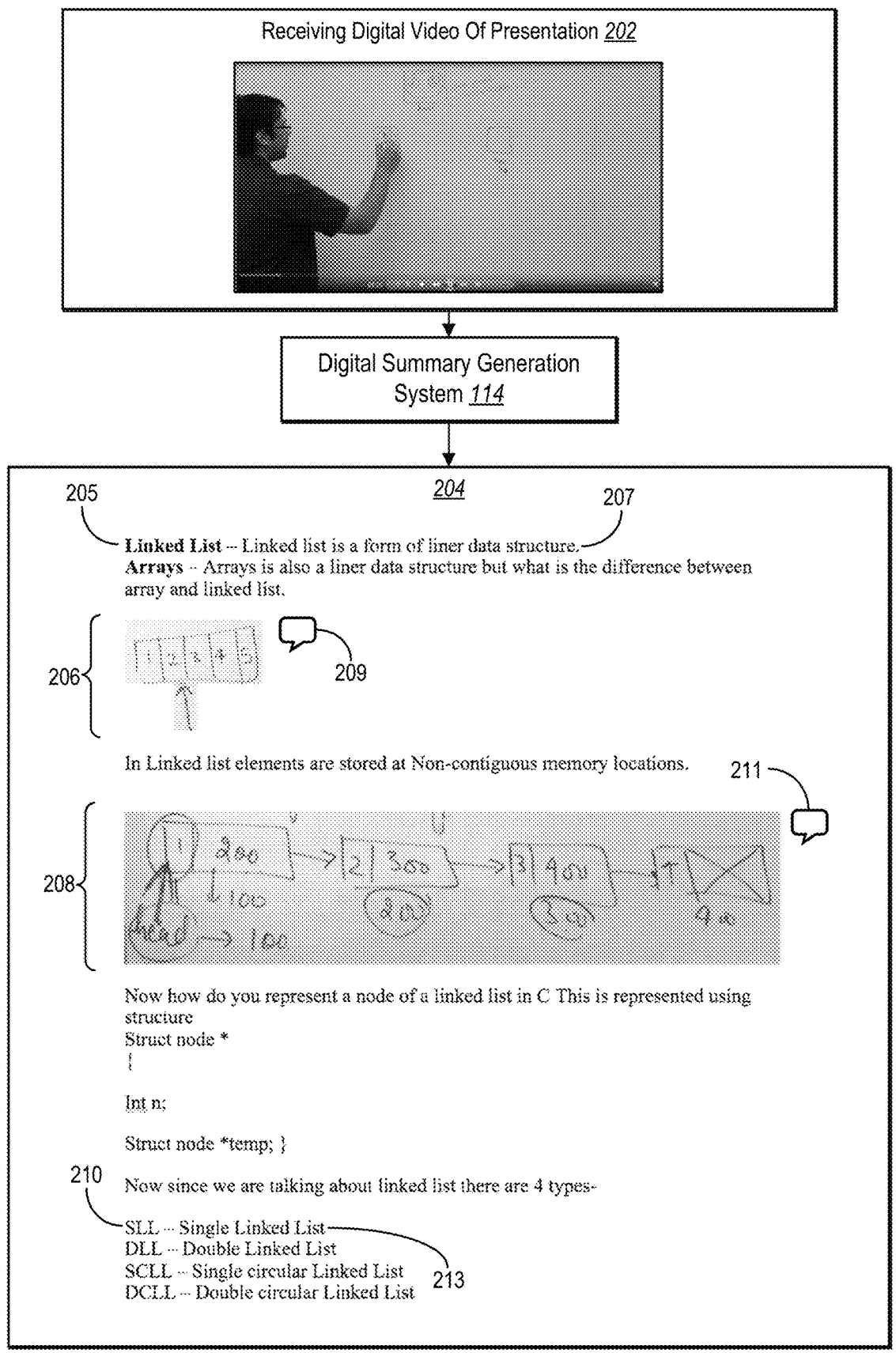
FIG. 2 illustrates a schematic diagram of generating a digital summary in accordance with one or more embodiments.

As discussed above, the digital summary generation system 114 can generate and provide a digital summary for a presentation represented in a digital video. In particular, FIG. 2 shows an overview of generating a digital summary in accordance with one or more embodiments. For instance, as shown in FIG. 2, the digital summary generation system 114 receives the digital video 202 portraying a presentation. As illustrated, the digital video 202 portrays a presentation of an individual speaking and writing on a white board over time. For instance, the digital video 202 portrays an individual entering and erasing handwritten content (e.g., handwritten script and handwritten drawings) on a writing surface while providing a spoken lecture regarding linked lists.

As shown in FIG. 2, the digital summary generation system 114 generates a digital summary 204 of the presentation. The digital summary 204 merges different portions of both a text transcript of digital audio from the digital video 202 and transcription of handwritten content from the written surface portrayed in the digital video 202 (over different target time periods). In particular, the digital summary generation system 114 generates the digital summary 204 based on distinct portions of the digital video 202 and based on a record of the flow of information in the presentation.

For example, as shown, the digital summary 204 includes a transcription 205 from handwritten text portrayed in the digital video 202 (i.e., "Linked List") together with a text transcript 207 of digital audio corresponding to the digital video 202 (i.e., "Linked list is a form of linear data structure"). In particular, the handwritten text transcription 205 reflects handwritten script from a first target time period and the audio text transcript 207 reflects digital audio from the first target time period. As explained in greater detail below, the digital summary generation system 114 combines the handwritten text transcription 205 and the audio text transcript 207 by monitoring the location of user entry of the handwritten text in the digital video 202 at the first time period (utilizing an edge detection algorithm), applying an optical character recognition algorithm (seeded with the audio text transcription 207), and aligning the handwritten text with the text transcription of the digital audio based on the common time period.

As illustrated in FIG. 2, the digital summary 204 also includes drawings 206, 208 (e.g., user entry of non-textual portions) from the writing surface in the digital video 202. Moreover, the digital summary 204 includes text elements 209, 211 corresponding to the drawings 206, 208. As shown in FIG. 2, the drawing 206 is a table (or array) with an arrow, and the drawing 208 is a flow diagram including various shapes. Moreover, the text elements 209, 211 comprise text transcriptions of digital audio corresponding to the drawings 206, 208. As explained in greater detail below, the digital summary generation system 114 generates the drawings 206, 208 and the text elements 209, 211 by monitoring presentation flow over time. In particular, the digital summary generation system 114 can determine locations of drawings entered on a writing surface at different times (e.g., by utilizing an edge detection algorithm and optical character recognition algorithm), crop the drawings from representative frames of the digital video, and aligning the cropped drawings with audio text transcriptions from the same time periods.

Additionally, the digital summary 204 includes short form text 210 together with long form text 213. As will be discussed in greater detail below, the digital summary generation system 114 can identify one or more short forms or abbreviations from the writing surface of the digital video. Specifically, the digital summary generation system can compare a transcription of handwritten script from a writing surface to a digital lexicon to determine if the handwritten script includes short form text. Then, the digital summary generation system 114 can determine the corresponding long form text for each short form text by utilizing the text transcript of the digital audio at and/or around the time period when the short form was written. The digital summary generation system 114 may then merge the short form text 210 from handwritten script entered in the digital video 202 at the target time period with the long form text 213 from the text transcript of the digital audio.

Although FIG. 2 illustrates a particular digital video of a presenter writing on a white board, the digital summary generation system 114 can operate with regard to a variety of different digital videos and corresponding presentations. For example, the digital video 202 of a presentation can include a recording of a lecture, address, symposium, and/or classroom discussion. The digital video 202 can further include various types of writing surfaces, such as a chalk board, white board, overhead projection, digital projection, and/or a poster. Similarly, although the digital summary 204 includes a particular combination of handwritten content and digital audio dealing with a particular topic (e.g., linked lists), the digital summary generation system 114 can merge a variety of different handwritten content and digital audio relating to different topics.

Figure 3:
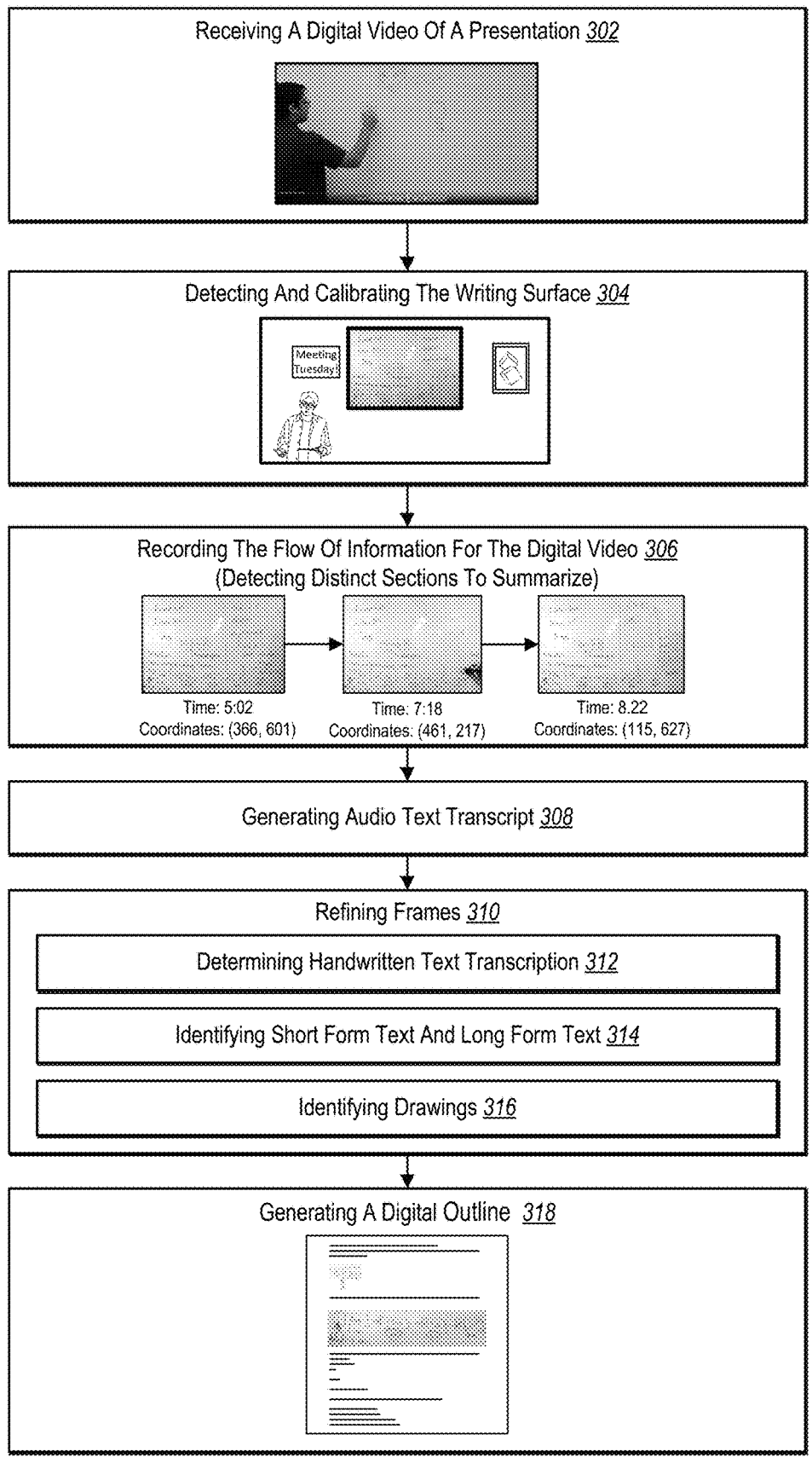
FIG. 3 illustrates an additional schematic diagram of generating a digital summary in accordance with one or more embodiments.

As mentioned above, the digital summary generation system 114 can generate a digital summary by recording a flow of information for a digital video and utilizing the flow of information together with audio text transcripts and handwritten text transcriptions to generate a digital summary. FIG. 3 illustrates a series of acts 302-318 for generating a digital summary in accordance with one or more embodiments.

As shown in FIG. 3, the digital summary generation system 114 performs the act 302 of receiving a digital video of a presentation. As discussed above, the digital summary generation system 114 can receive the digital video from the digital media management system 112, the client device 102 via the network 108, and/or from another source via the network 108. The digital video can be a live stream of a presentation (such that the digital summary generation system 114 generates a digital summary in real time during the presentation) or a recorded digital video of a presentation (such that the digital summary generation system 114 generates a digital summary after the conclusion of the presentation).

Additionally, as shown in FIG. 3, the digital summary generation system 114 performs the act 304 of detecting and calibrating the writing surface in video frames. The digital summary generation system 114 can identify the writing surface from the frames of the digital video. In particular, the digital summary generation system 114 can utilize a machine learning model to separate foreground from the background writing surface. In particular, the digital summary generation system 114 can utilize a machine learning model together with a Kanade-Lucas-Tomasi feature tracker (KLT tracker) to identify the writing surface and distinguish the writing surface from other objects (e.g., to ensure that foreground objects are not included in the analysis of the writing surface). Additional detail regarding calibrating the writing surface is provided below (e.g., in relation to FIG. 4).

As shown in FIG. 3, the digital summary generation system 114 also performs the act 306 of recording the flow of information for the digital video. As discussed above, the digital summary generation system 114 can apply an edge detection algorithm to determine areas where old handwritten content is removed and new handwritten content is added over time. For example, the digital summary generation system 114 can monitor times when handwritten content is entered (or removed) and the coordinate location of the region of the handwritten content on the writing surface. The digital summary generation system 114 can also record times corresponding to capturing different portions of digital audio.

Moreover, as illustrated in FIG. 3, the act 306 can include detecting distinct sections (e.g., target time periods) to summarize. In some embodiments, the digital summary generation system 114 can determine distinct sections by identifying and capturing representative frames of the digital video. For example, the digital summary generation system 114 can track changes to edge features across frames of the digital video. Based on changes in the edge features, the digital summary generation system 114 can identify representative frames that portray content from the presentation. For example, the digital summary generation system can generate a representative frame upon detecting deletion of edge features or addition of edge features in a different region of a writing surface. Additional detail regarding tracking the flow of information and detecting distinct sections of a presentation is provided below (e.g., in relation to FIGS. 5 and 6A).

Further, as shown in FIG. 3, the digital summary generation system 114 can perform the act 308 of determining one or more audio text transcripts. In particular, the digital summary generation system 114 can apply a speech-to-text algorithm to digital audio to generate a text transcript of the digital audio. For example, the digital summary generation system 114 can utilize a speech-to-text algorithm to generate a text transcript from the digital audio that preserves the timing (e.g., time stamps) from the digital video. In some embodiments, the digital summary generation system 114 generates a map of words that indexes words from the digital video with a corresponding timestamp where the word were spoken during a presentation.

As illustrated in FIG. 3, the digital summary generation system 114 can also include the act 310 of refining frames of the digital video. In particular, the digital summary generation system 114 can digitize representative frames (e.g., the representative frames identified at the act 306) by applying an optical character recognition algorithm. For example, the digital summary generation system 114 can separate textual regions (e.g., regions containing handwritten script) and image/drawing regions. In some embodiments, the digital summary generation system 114 separates textual regions and drawing regions by applying an optical character recognition (e.g., textual regions correspond to high text character probabilities and drawings regions correspond to low text character probabilities). The digital summary generation system can also apply an optical character recognition algorithm to convert the handwritten script to digital text characters.

For example, as illustrated, the digital summary generation system 114 performs the act 312 of determining handwritten text transcripts. In particular, the digital summary generation system 114 applies an optical character recognition algorithm to a region of a representative frame (e.g., a region located by applying an edge detection algorithm at the act 306). The digital summary generation system 114 can utilize the optical character recognition algorithm to determine that the region includes handwritten script and convert the handwritten script to digital text characters (e.g., digital words) to generate a transcription of the handwritten script. Moreover, the digital summary generation system 114 can associate timing and/or location information from entry of the handwritten script to the transcription of the handwritten script.

As discussed above, because writing surfaces in a presentation can include handwritten script, optical character recognition algorithms can be unreliable in some areas. Accordingly, as part of the act 312, the digital summary generation system 114 can combine digital audio as input to the optical character recognition algorithm. In particular, the digital summary generation system 114 can use the audio text transcript (from the act 308) as a hint for the OCR library to perform image to text conversion.

In addition, in some embodiments, the digital summary generation system 114 can utilize a similarity indexed search to auto-correct transcriptions from handwritten text. In particular, the digital summary generation system 114 can utilize words generated by the optical character recognition algorithm to search for similar spoken words within a text transcript of digital audio at a similar time. Upon identifying corresponding (e.g. similar) spoken words, the digital summary generation system 114 can replace a word identified by the optical character recognition algorithm with the spoken word identified in the audio text transcript. In this manner, the digital summary generation system 114 can utilize a similarity index search approach to auto-correct handwritten text transcripts. Additional detail regarding generating handwritten text transcriptions is provided below (e.g. in relation to FIG. 6A).

Additionally, as part of the act 310, the digital summary generation system 114 can perform an act 314 of identifying short form text and long form text. As mentioned, presenters often use short form text while writing on a writing surface. Although applying an optical character recognition algorithm can extract the short form text, this form may not be informational. The digital summary generation system 114 can enhance this short form text with full form text using digital audio of the presentation. In particular, the digital summary generation system 114 can provide the audio text transcript (from the act 308) as input to the preferred dictionary of the optical character recognition algorithm. The digital summary generation system 114 can then utilize the optical character recognition algorithm to identify long form text from the audio text transcript.

In some embodiments, the digital summary generation system 114 searches the audio text transcript to identify long form text in a digital audio transcript based on short form text from handwritten script. For example, the digital summary generation system 114 can generate an index map from the digital audio transcript that reflects text with a corresponding timestamp reflecting when the text was uttered. The digital summary generation system 114 can identify short form text by comparing text characters from handwritten script to a digital lexicon (e.g., a dictionary) and determining that the text characters are not included in the digital lexicon. The digital summary generation system 114 can then identify the indexed timestamp of the handwritten script and search the index map based on the indexed timestamp (e.g., search in both directions of the map). The digital summary generation system 114 can compare the text characters from the handwritten script with words in the indexed map (e.g., to determine if text characters correspond to words in the indexed map). Additional detail regarding identifying long form text and short form text is provided below (e.g., in relation to FIG. 6B).

As illustrated in FIG. 3, the digital summary generation system 114 can also perform the act 316 of identifying drawings. As discussed above, the digital summary generation system 114 can analyze a region from a representative frame (e.g., utilizing an optical character recognition algorithm) and determine that the region includes non-textual elements (e.g., drawings that return a low probability of textual characters). Then, based on the identification of non-textual elements, the digital summary generation system 114 can determine that the portion of the writing surface includes a diagram. The digital summary generation system 114 can crop the region of the representative frame to generate a digital image that isolates the diagram. Moreover, the digital summary generation system 114 can associate the timing and/or location of the drawing (e.g., when and where the drawing was entered during the digital video) with the digital image of the diagram.

As shown in FIG. 3, the digital summary generation system 114 can also perform an act 318 of generating a digital summary. The digital summary generation system 114 can build the digital summary utilizing audio text transcription (from the act 308), the handwritten text transcription (from the act 310), the short form text and long form text (from the act 310), and the drawings (from the act 310). In particular, the digital summary generation system 114 can merge different audio text transcriptions, handwritten text transcriptions, the short form text and long form text, and drawings based on the record of the flow of information (from the act 306). For example, the digital summary generation system 114 can isolate a first target time period corresponding to a first representative frame. The digital summary generation system 114 can then merge audio text transcription and handwritten text transcription corresponding to the first target time period. The digital summary generation system 114 can also identify a second time period corresponding to a second representative frame. The digital summary generation system 114 can merge audio text transcript and a drawing corresponding to the second time period. Similarly, the digital summary generation system 114 can identify a third time period corresponding to a third representative frame. The digital summary generation system 114 can merge short form text (from handwritten script) and long form text (from audio text transcript) corresponding to the third time period. In this manner, the digital summary generation system 114 can generate a digital summary that intuitively merges content from a presentation based on the presentation flow.

Figure 4:
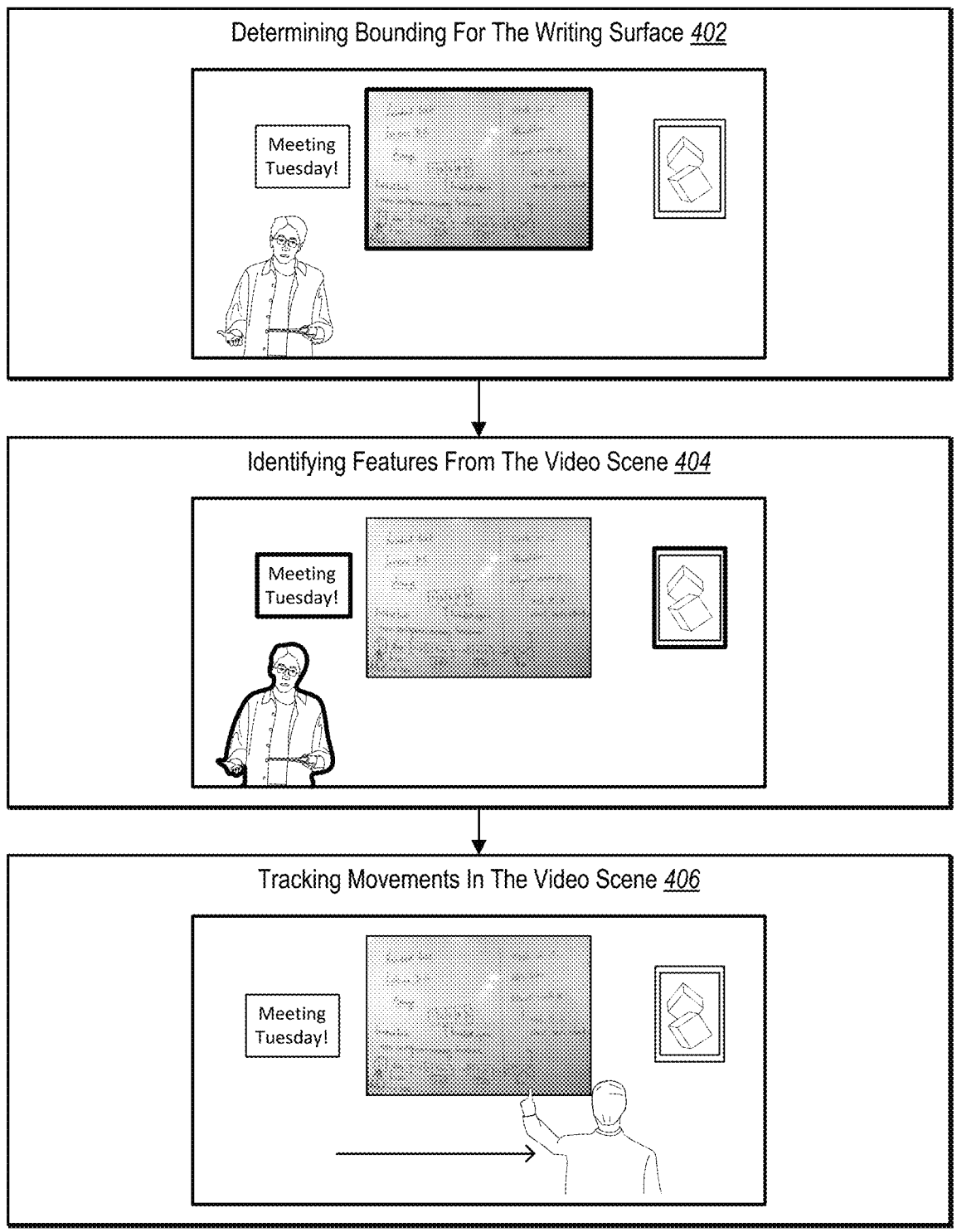
FIG. 4 illustrates detecting and calibrating a writing surface portrayed in a digital video in accordance with one or more embodiments.

As discussed above, the digital summary generation system 114 can detect and calibrate a writing surface from a digital video portraying a presentation. FIG. 4 illustrates a series of acts 402-406 for calibrating a writing area in accordance with one or more embodiments. For example, as shown in FIG. 4, the digital summary generation system 114 can perform the act 402 of determining a bounding for the writing surface. In relation to FIG. 4, the digital summary generation system 114 determines the bounding for the writing surface by utilizing a convolutional neural network (CNN).

The digital summary generation system 114 can train a convolutional neural network (CNN) to separate the foreground of an image from the background and determine the bounding of the writing surface. For example, in some embodiments, the digital summary generation system 114 trains the CNN with a number (e.g., 1200) training samples (e.g., training digital images) portraying a writing surface and/or non-writing surface areas (e.g., auto-generated non-board areas). To illustrate, the digital summary generation system 114 can access a database that stores training digital images and ground truth writing surfaces. The digital summary generation system 114 accesses the training digital images from the database to provide as input to the CNN. Based on the input training digital images, the CNN generates a predicted writing surface.

Further, the digital summary generation system 114 compares the predicted writing surface with a ground truth writing surface. For example, the digital summary generation system 114 can utilize a loss function to determine an error or measure of loss associated with the predicted writing surface and the ground truth writing surface. For example, the digital summary generation system 114 utilizes a cross entropy loss function to determine a measure of loss between the predicted writing surface and the ground truth writing surface.

Based on the comparison, the digital summary generation system 114 can also perform a back propagation to train the CNN. In particular, the digital summary generation system 114 can back propagate by modifying one or more weights associated with the CNN. Indeed, the digital summary generation system 114 modifies weights within layers of the CNN to improve the accuracy of the CNN by reducing the error or measure of loss. The digital summary generation system 114 can repeat this process over different batches of training data to generate a trained CNN.

Once trained, the digital summary generation system 114 can input frames from the digital video into the CNN to identify a writing surface. In particular, the digital summary generation system 114 can analyze a frame utilizing the CNN to generate a writing surface and confidence score. Moreover, the digital summary generation system 114 can compare the confidence score with a predetermined threshold to identify the writing surface. In one or more embodiments, the digital summary generation system 114 can identify a bounded rectangle (e.g., four corners) as the writing surface in the digital video.

Similarly, as shown in FIG. 4, the digital summary generation system 114 can perform the act 404 of identifying features from the video scene. In addition to identifying the writing surface, the digital summary generation system 114 can identify other features from the scene. Then, as shown in FIG. 4, the digital summary generation system 114 can perform the act 406 of tracking movements in the video scene. More specifically, using a Kanade-Lucas-Tomasi feature tracker, the digital summary generation system 114 can track the movement of any of the features throughout the video. For example, in one or more embodiments, the digital summary generation system 114 tracks movement utilizing the approach described by Carlo Tomasi and Takeo Kanade in "An Iterative Image Registration Technique with an Application to Stereo Vision," International Joint Conference on Artificial Intelligence, pages 674-679, 1981, hereby incorporated in its entirety. In one or more embodiments, the digital summary generation system 114 determines when one or more of these features passes in front of the writing surface during the digital video and does not include the moving feature in the digital summary based on recognizing that it is not part of the writing surface.

In some embodiments, the digital summary generation system performs the act 402 for a threshold number of frames (e.g., the first few frames of a digital video) until identifying the bounding region of the writing surface, Br(i), with a confidence score that satisfies a confidence threshold. For subsequent frames, the digital summary generation system can then perform the acts 404, 406 by using the same rectangle as a base while tracking features using KLT tracker for fast tracking of the board area.

Figure 5:
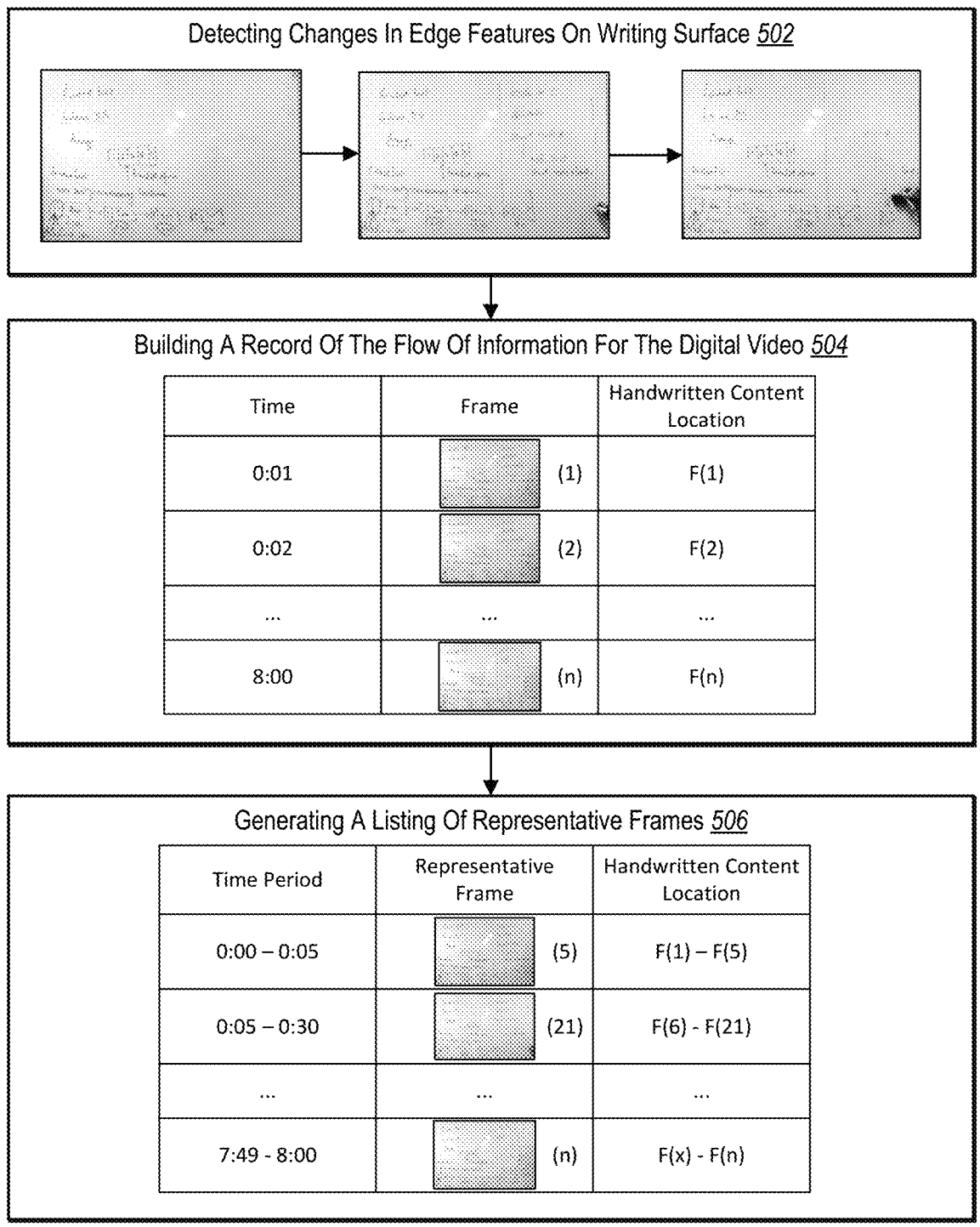
FIG. 5 illustrates generating a record of the flow of information for a digital video and identifying distinct sections to summarize in accordance with one or more embodiments.

As discussed above, the digital summary generation system 114 can build a record of the flow of information for a digital video and determine distinct sections (e.g., target time periods) to summarize. FIG. 5 illustrates a series of acts 502-506 for generating a record of the flow of information and determining distinct sections in accordance with one or more embodiments.

As illustrated in FIG. 5, the digital summary generation system 114 performs the act 502 of detecting changes in edge features on a writing surface. In particular, the digital summary generation system 114 can apply an edge detector to determine edge features and edges corresponding to frames of a digital video. In one or more embodiments, the digital summary generation system 114 applies a modified canny edge detector to generate a gray image with lines and points representing edges. The digital summary generation system 114 can also perform adaptive hysteresis localization and thresholding to reduce noise and false edges.

The digital summary generation system 114 can compare edge features between frames (e.g., between a first frame and a second frame). For example, with regard to the act 502, the digital summary generation system 114 can detect increases in edge features on a writing surface across frames. Moreover, the digital summary generation system 114 can identify increased edge features across different regions of a writing surface. For example, the digital summary generation system 114 can detect that edge features stop increasing in a first region of a writing surface and that edge features begin to increase in a second region of the writing surface. In one or more embodiments, the digital summary generation system 114 can identify an increase in edge features (e.g., from a first region to a second region) based on the increase exceeding a predetermined threshold edge feature change.

For example, FIG. 5 illustrates an instructor adding handwritten content in a first column of a writing surface. The instructor then moves to a new region (e.g., the next column) and adds additional handwritten content in the second column. The digital summary generation system 114 can detect the increased edge features in the different regions of the writing surface.

The digital summary generation system 114 can also detect and record when and where new information is entered. For example, the digital summary generation system 114 can identify regions (e.g., bounding shapes) where edge features are added. The digital summary generation system 114 can also determine the time when these edge features are added. Because, as discussed above, the digital summary generation system 114 can identify and track objects that are not part of the writing surface, the digital summary generation system 114 can disregard edge features from these moving objects.

The digital summary generation system can also detect decreases in edge features. For example, the digital summary generation system 114 can apply a modified canny edge detector to determine edge features in frames. The digital summary generation system 114 can compare edge features across sequential frames and determine a decrease in edge features. Based on the determination that the writing surface contains fewer edge features, the digital summary generation system 114 can determine that information has been removed from the writing surface. Further, in one or more embodiments, the digital summary generation system 114 determines where edge features have been removed and determines, based on the location of the removed edge features, the location of the removed information. The digital summary generation system 114 can further record the time and location of the removal of information.

For example, as illustrated in FIG. 5, after an instructor adds handwritten content to a second column of a writing surface, the instructor proceeds to erase the handwritten content. The digital summary generation system 114 detects the removal of handwritten content by identifying a decrease in edge features across frames.

In some embodiments, the digital summary generation system 114 determines that handwritten content has been removed based on a threshold edge feature change. In particular, the digital summary generation system 114 can compare a measure of edge features lost with the threshold edge feature change. If the measure of edge features lost satisfies the threshold edge feature change, the digital summary generation system 114 can determine that an instructor has removed handwritten content. In this manner, the digital summary generation system 114 can detect removal (and/or addition) of handwritten content on a writing surface throughout a presentation.

As illustrated in FIG. 5, the digital summary generation system 114 also performs the act 504 of building a record of the flow of information for the digital video. In particular, based on the detected changes in edge features on the writing surface (in the act 502), the digital summary generation system can build a record of the flow of information in a presentation. For example, the digital summary generation system 114 can record when and where handwritten content is entered and removed from the writing surface.

The digital summary generation system 114 can identify and record the area on the writing surface where handwritten content has been entered. For example, the digital summary generation system 114 can record (e.g., as a vector) the coordinates where information is entered, bounding of an area or sub-region of the writing surface where information is entered, or other location information. Additionally, the digital summary generation system 114 can identify and record the time corresponding to the entry of handwritten content on the writing surface. The digital summary generation system 114 can identify and record a frame of the digital video, a time stamp or time frame of the digital video, and/or a time stamp or time frame of the audio from the digital video that corresponds to the entered handwritten content.

Accordingly, the digital summary generation system 114 can determine locations of sections of handwritten content on the writing surface. That is, the digital summary generation system 114 can determine the location and time at which a single letter was entered on a board. Further, the digital summary generation system 114 can also determine the location and time at which a sentence, phrase, paragraph, bullet point and associated text, or other section of text was entered onto the board. That is, the digital summary generation system 114 can determine whether text entered onto the writing surface belongs to a previously-existing section or a new section based on its proximity to other edge features on the writing surface. Additionally, based on removal of information from the writing surface, the digital summary generation system 114 can determine that new text input into the area of the removal is a new section, and not a continuation of the section removed from that area.

Further, as illustrated in FIG. 5, the digital summary generation system 114 can perform the act 506 of generating a listing of representative frames (e.g., frames that capture unique content from distinct portions of the digital video). As discussed above, in one or more embodiments, the digital summary generation system 114 can detect and record when information has been added or removed from the writing surface (e.g., regions of a writing surface) and can identify representative frames of the digital video corresponding to these changes. Based on these determinations, the digital summary generation system 114 can identify a set of frames that include information for each section. Then, the digital summary generation system 114 can identify a set of frames including unique information from the digital video.

The digital summary generation system 114 can determine representative frames based on changes in edge features (e.g., from the act 502). For example, when the digital summary generation system 114 detects an increase in the edge features for a new region of the writing surface (relative to an initial region), the digital summary generation system 114 can capture a representative frame. Specifically, the digital summary generation system 114 can capture a representative frame reflecting the state of the writing surface prior to entry of handwritten content in the new region. The representative frame thus portrays the unique content in the original region.

The digital summary generation system 114 can also store information regarding the flow of information corresponding to a representative frame. For example, as illustrated in FIG. 5, the digital summary generation system 114 can determine a target time period of the digital audio or digital video corresponding to the representative frame. Moreover, the digital summary generation system 114 can determine vectors indicating the location of handwritten content entered for the associated region over time. For example, the digital summary generation system 114 can store a representative frame with a first vector and first time indicating entry of a first subset of handwritten content and a second vector and second time indicating entry of a second subset of handwritten content (i.e., vectors F(1) through F(5) illustrated in FIG. 5)

Similarly, when the digital summary generation system 114 detects a decrease in edge features (e.g., a decrease beyond a threshold edge feature change), the digital summary generation system 114 can capture a representative frame. Specifically, the digital summary generation system 114 can capture a representative frame prior to the decrease in edge features (e.g., prior to removal of the handwritten content). Such a representative frame reflects the content on the writing surface prior to removal of handwritten content for summarizing this period of the presentation.

As mentioned above, the digital summary generation system 114 can identify target time periods reflecting distinct portions of a presentation to summarize. In some embodiments, the digital summary generation system 114 can determine distinct portions of a presentation to summarize based on representative frames. As illustrated in FIG. 5, a representative frame can reflect the previous 25 seconds of a digital video prior to the representative frame (e.g., 25 seconds occur between an initial representative frame at time 0:05 and the representative frame at 0:30). The digital summary generation system can summarize those 25 seconds of the digital video as a discrete section in a digital summary (e.g., by including handwritten content added during those 25 seconds in addition to audio text corresponding to those ten seconds). Thus, the process of generating a listing of representative frames can also include detecting distinct portions of the digital video to summarize.

The acts 502-506 discussed above can also be described in terms of algorithms utilized by a computing device implementing the digital summary generation system 114. For example, in one or more embodiments the digital summary generation system 114 utilizes the following computer-implemented approach:

Algorithm 1
In Br(i) of each frame (i) of the video, do the following:
a) Perform edge detection in the region. Find edges using modified canny edge detector to generate a gray image with lines and points representing the edges. Perform adaptive hysteresis localization and thresholding so that noise in the image does not create false edges and edges marked should be as close as possible to the edge in the real image.
b) In subsequent frames (i+1), if the edge features keep increasing, keep increasing (i)
c) With new edge feature being added, maintain a list to store the flow of information keep track of the order in which instructor has written the content while filling full board. For this, whenever new data is written in the frame content, store that location (x,y) in a vector F(j).
d) If edge feature in any subsequent frame (i+1), reduces in any region greater than threshold T, then mark that frame j=i+1, as the frame for new content. At this point, add frame(i) in the Global Content List (GL). This contains frame data as well as vector F(j) filled till this point. After storing this information, F(j) is set to NULL so as to reset it for next frame.
f) Keep tracking frames with that region until no more features are added in that region.
g) Extract that frame and add that as the new frame in GL.
h) Perform this until all frames in the video are scanned.
At the end of this step, the digital summary generation system 114 has a vector of frames (GL) with unique content.

Based on the flow of information and representative frames from a digital video portraying a presentation, the digital summary generation system 114 can generate a digital summary. For example, FIG. 6A illustrates generating a digital summary for a digital video utilizing audio text transcripts and handwritten text transcriptions based on the flow of information for the digital video in accordance with one or more embodiments.

Figure 6A:
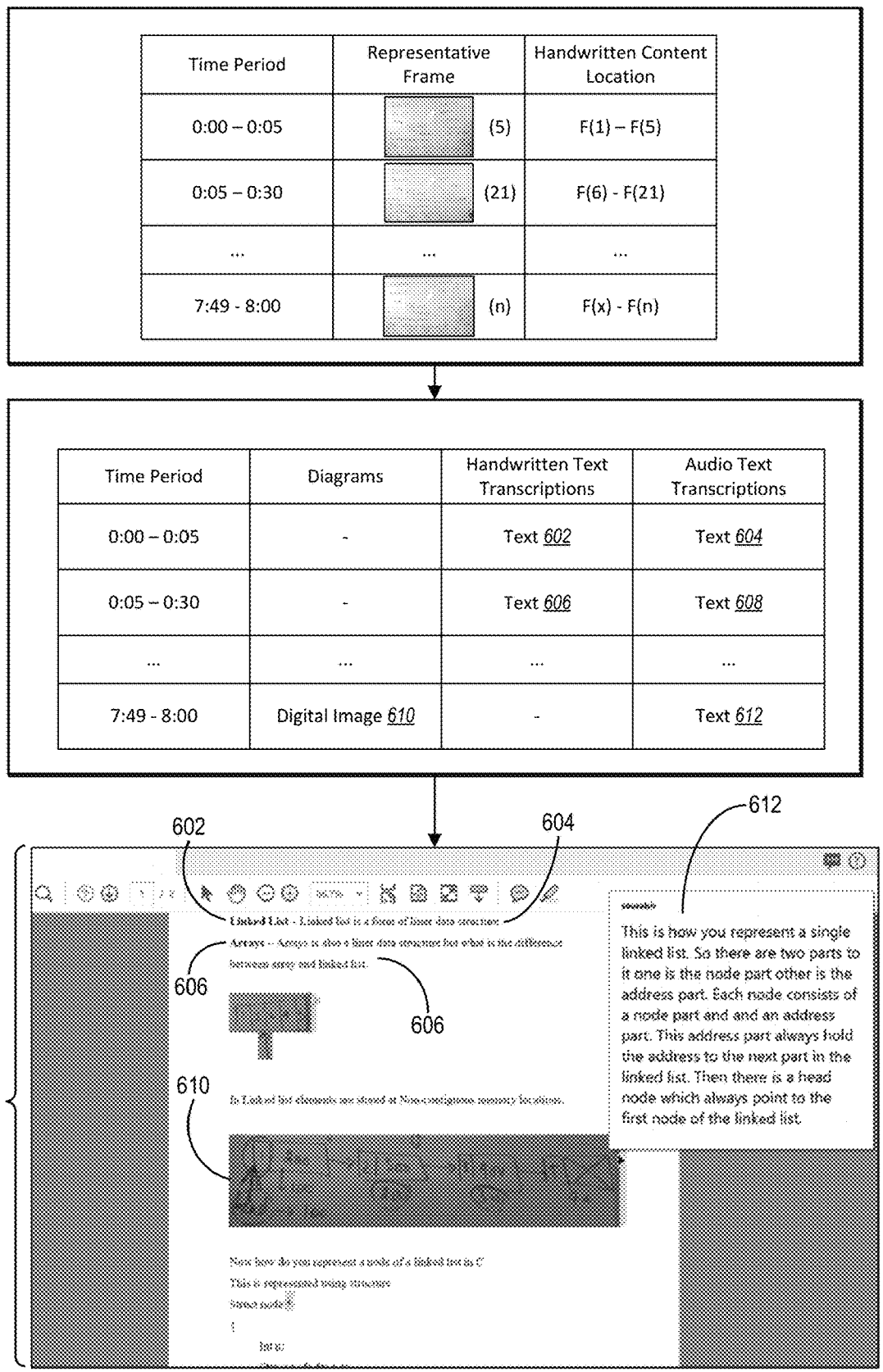
FIGS. 6A-6B illustrate generating a digital summary based on a record for the flow of information for a digital video in accordance with one or more embodiments.

Specifically, as shown in FIG. 6A, the digital summary generation system 114 analyzes the representative frames and corresponding flow of information generated in the acts 504 and 506 from FIG. 5 to determine handwritten text transcriptions and diagrams. As shown, the digital summary generation system 114 can analyze representative frames corresponding to different target time periods and generate transcriptions of handwritten text entered on a portion of the writing surface during the target time period. In particular, the digital summary generation system can utilize the location of the handwritten content (stored with the representative frame) and apply an optical character recognition algorithm to the location within the representative frame to generate a handwritten text transcription.

As mentioned above, the digital summary generation system 114 can determine a transcription for handwritten script based both on the handwritten script and the digital audio from the digital video. Indeed, because handwritten content on the writing surface can be sloppy or otherwise difficult to decipher, the digital summary generation system 114 can utilize digital audio corresponding to the target time period at which handwritten content was entered onto the writing surface to determine a more accurate transcription of the writing surface. Indeed, as illustrated in FIG. 6A, the digital summary generation system 114 generates audio text transcripts for target time periods of the digital images. The digital summary generation system 114 can utilize the audio text transcripts for the target time periods to improve the handwritten text transcriptions.

As mentioned above, one way that the digital summary generation system 114 can utilize digital audio to improve transcription of handwritten text is by utilizing the digital audio as an input to an optical character recognition algorithm. For example, in some embodiments, the digital summary generation system 114 can utilize an audio text transcript for a target time period to seed (e.g., act as a hint) for the optical character recognition algorithm. Specifically, the digital summary generation system 114 can add words from the audio text transcript to the OCR library in applying an optical character recognition to handwritten script for a particular target time period. In this manner, the optical character recognition algorithm can more accurately align the handwritten script to the digital audio for the particular target time period.

In some embodiments, the digital summary generation system 114 compares output of words from an optical character recognition algorithm directly to the digital audio utilizing a similarity index approach. In particular, the digital summary generation system 114 can utilize an optical character recognition algorithm to generate a word from the handwritten script portrayed in a representative frame. The digital summary generation system 114 can identify a timestamp corresponding to when the handwritten script corresponding to the word was entered on the writing surface (e.g., based on the recorded flow of information as described above in FIG. 5). The digital summary generation system 114 can utilize the timestamp to compare the word generated by the optical character recognition algorithm within an audio text transcript corresponding to the target time period. Specifically, the digital summary generation system 114 can begin at the timestamp and search outward (e.g., forward and backward) within the audio text transcript for similar words. In this manner, the digital summary generation system 114 can check to see if words identified via the optical character recognition algorithm align with the digital audio.

To illustrate, in some embodiments, in generating the audio text transcript the digital summary generation system 114 maintains an indexed map of words and their timestamp while converting digital audio to text. If a word identified by the optical character recognition algorithm is not found in the map of words and there is a corresponding (e.g., a close or similar) spoken word found within the index map, the digital summary generation system 114 can utilize the spoken word from the index map.

The digital summary generation system 114 can determine word similarity (e.g., a spoken word corresponding to the word identified from the optical character recognition algorithm) in a variety of ways. In some embodiments, the digital summary generation system 114 utilizes an n-gram model, trie for determining similarity between two words (e.g., to compare words in the index map to words generated by the optical character recognition algorithm). The digital summary generation system 114 can utilize a variety of word similarity algorithms to compare words. Accordingly, the digital summary generation system 114 can identify a similar replacement word from a text audio transcript to improve a transcription of text from handwritten script.

If no similar word is found in a map of words, the digital summary generation system 114 can leave the transcription of the handwritten text unchanged (e.g. utilize the word determined from the optical character recognition algorithm). If a similar word is found, the digital summary generation system 114 can replace the word identified via the optical character recognition algorithm with the spoken word identified from the word map.

For example, in some embodiments, the digital summary generation system 114 utilizes the following approach:

```
ALGORITHM 2
For each (frame: uniqueFrameList)
{
    For each(word : wordlist (frame)) //wordlist returned by OCR for
    each frame
    {
        replacementWord = word
        If ( ("word" not found in MP) && ( IsCloseWordFound ( MP,
        word, timeStamp) )
        {
            //replace word with replacementWord
            replacementWord = word // updated word.
        }
    }
}
```

Utilizing this approach the digital summary generation system 114 can correct a variety of words improperly identified utilizing an optical character recognition algorithm. For example, the following table illustrates words identified by an optical character recognition algorithm that the digital summary generation system 114 replaced with proper words from the digital audio.

| Actual word | OCR recognized word | Results with digital summary generation system |
| --- | --- | --- |
| head | lead | head |
| locations | localiors | locations |
| space | opace | space |

As shown in FIG. 6, the digital summary generation system 114 can generate handwritten text transcriptions for various target time periods of a digital video. In relation to FIG. 6, the digital summary generation system 114 generates a handwritten text transcription for each representative frame corresponding to a target time period. For example, the digital summary generation system 114 generates text 602 for a first handwritten text transcription corresponding to a first time period (e.g., text reflecting handwritten script entered in a first representative frame corresponding to the first time period). The digital summary generation system also generates text 606 corresponding to a second handwritten text transcription corresponding to a second time period (e.g., text reflecting handwritten script entered in a second representative frame corresponding to a second time period).

As illustrated, the digital summary generation system also determined audio text transcripts (e.g., text 604, 608) corresponding to the first time period and the second time period. In particular, the digital summary generation system 114 utilizes a speech to text algorithm to identify a first audio text transcript for the first time period and a second audio text transcript for the second time period.

In addition to handwritten text transcriptions and audio text transcripts, the digital summary generation system 114 can also identify drawings and generate audio text transcripts (e.g., for target time periods corresponding to representative frames). As shown in FIG. 6, the digital summary generation system 114 identifies a drawing from handwritten content in a representative frame. Specifically, the digital summary generation system 114 utilizes the flow of information regarding the presentation (as described in FIG. 5) to determine a location of a portion of handwritten content entered during a target time period. The digital summary generation system 114 analyzes a representative frame corresponding to the target time period to determine that the portion of handwritten text includes a drawing.

The digital summary generation system 114 can determine that a portion of handwritten content includes a drawing in a variety of ways. In some embodiments, the digital summary generation system 114 utilizes an optical character recognition algorithm. For example, the digital summary generation system 114 can analyze a portion of handwritten content utilizing an optical character recognition algorithm to generate a text character confidence score (e.g., a score indicating a likelihood that the handwritten content corresponds to text characters). If the text character confidence score falls below a confidence threshold, the digital summary generation system 114 can determine that the handwritten content includes a drawing. In some embodiments, the digital summary generation system 114 can utilize other algorithms, such as a classification algorithm (e.g., a machine learning and/or neural network) to determine that the handwritten content includes a diagram (e.g., includes non-textual content).

In addition, the digital summary generation system 114 can generate a digital image of the diagram. For example, using the location of handwritten content (from the flow of information collected in FIG. 5) the digital summary generation system 114 can crop a representative frame to generate a digital image of a drawing. To illustrate, the digital summary generation system 114 can determine a set of vectors (e.g., F(x) to F(n) as shown in FIG. 6A) that reflect the locations of handwritten content during a target time period. The digital summary generation system 114 can generate a digital image by cropping a representative frame using the set of vectors. Specifically, the digital summary generation system 114 can determine a bounding shape (e.g., a bounding box) that encompasses the set of vectors and crop the representative frame utilizing the bounding shape.

In this manner, the digital summary generation system 114 can generate a digital image 610. In particular, for a third time period, the digital summary generation system 114 can generate the digital image 610 that includes a diagram entered on a writing surface within the third time period. Moreover, as shown, the digital summary generation system 114 can also determine text 612 of an audio text transcription for the third time period.

As mentioned above, the digital summary generation system 114 can generate a digital summary by merging handwritten content handwritten content (from the representative frames) with corresponding audio text transcripts (from corresponding target time periods). FIG. 6A illustrates the digital summary generation system 114 generating a digital summary 614 in accordance with one or more embodiments. Specifically, the digital summary generation system 114 generates the digital summary 614 by merging the text 602 (a first handwritten text transcription for a first time period), the text 604 (a first audio text transcript for the first time period), text 606 (a second handwritten text transcription for a second time period), text 608 (a second audio text transcript for the second time period), the digital image 610 (a digital image reflecting a diagram entered in a third time period), and the text 612 (a third audio text transcript for the third time period).

In particular, the digital summary generation system 114 generates the digital summary 614 by merging handwritten content and digital audio for each target time period (e.g., each target time period corresponding to a representative frame). In particular, the digital summary generation system 114 generates the digital summary 614 by including the text 602 (a first handwritten text transcription for a first time period) adjacent to the text 604 ((a first audio text transcript for the first time period). Similarly, the digital summary generation system 114 proceeds to the next target time period (e.g., in a sequence of time periods of the digital video) and includes the text 606 (a second audio text transcript for the second time period) adjacent to the text 608 (a second audio text transcript for the second time period). The digital summary generation system 114 continues by merging content through subsequent target time periods.

For example, the digital summary generation system includes the digital image 610 (a digital image reflecting a diagram entered in a third time period) with the text 612 (a third audio text transcript for the third time period). In relation to FIG. 6A, the digital summary generation system 114 includes the text 612 as part of a hover-activated element. Thus, the digital summary generation system displays the hover-activated element based on user interaction (e.g., hovering over the digital image 610).

Although not illustrated in FIG. 6A, the digital summary generation system 114 can also correct skewed handwritten content entered on a writing surface. For example, the digital summary generation system 114 identify handwritten content written at a skew angle and correct the angle. Similarly, the digital summary generation system 114 can identify lines of handwritten content where the size of the letters changes significantly over the course of the lines and can correct the size to be uniform. More specifically, the digital summary generation system 114 can identify the direction of the text and a shear angle for the text. Then, the digital summary generation system 114 can utilize the textual direction and the shear angle to create a perspective matrix and can apply the matrix to the lines of text to correct any distortions. The digital summary generation system 114 can feed the corrected text to the optical character recognition algorithm to more accurately determine a transcription of handwritten text.

The digital summary generation system 114 can also identify information from the writing surface that is not related to the digital presentation. For example, a writing surface during a presentation might have announcements written on a portion of the writing surface that are not related to the presentation. The digital summary generation system 114 can, based both on the information being present for the presentation and on the content of the information, determine that a portion of the information on the writing surface is not related to the presentation. Then, based on that determination, the digital summary generation system 114 can exclude that information from the digital summary and/or the transcription of the writing surface.

Figure 6B:
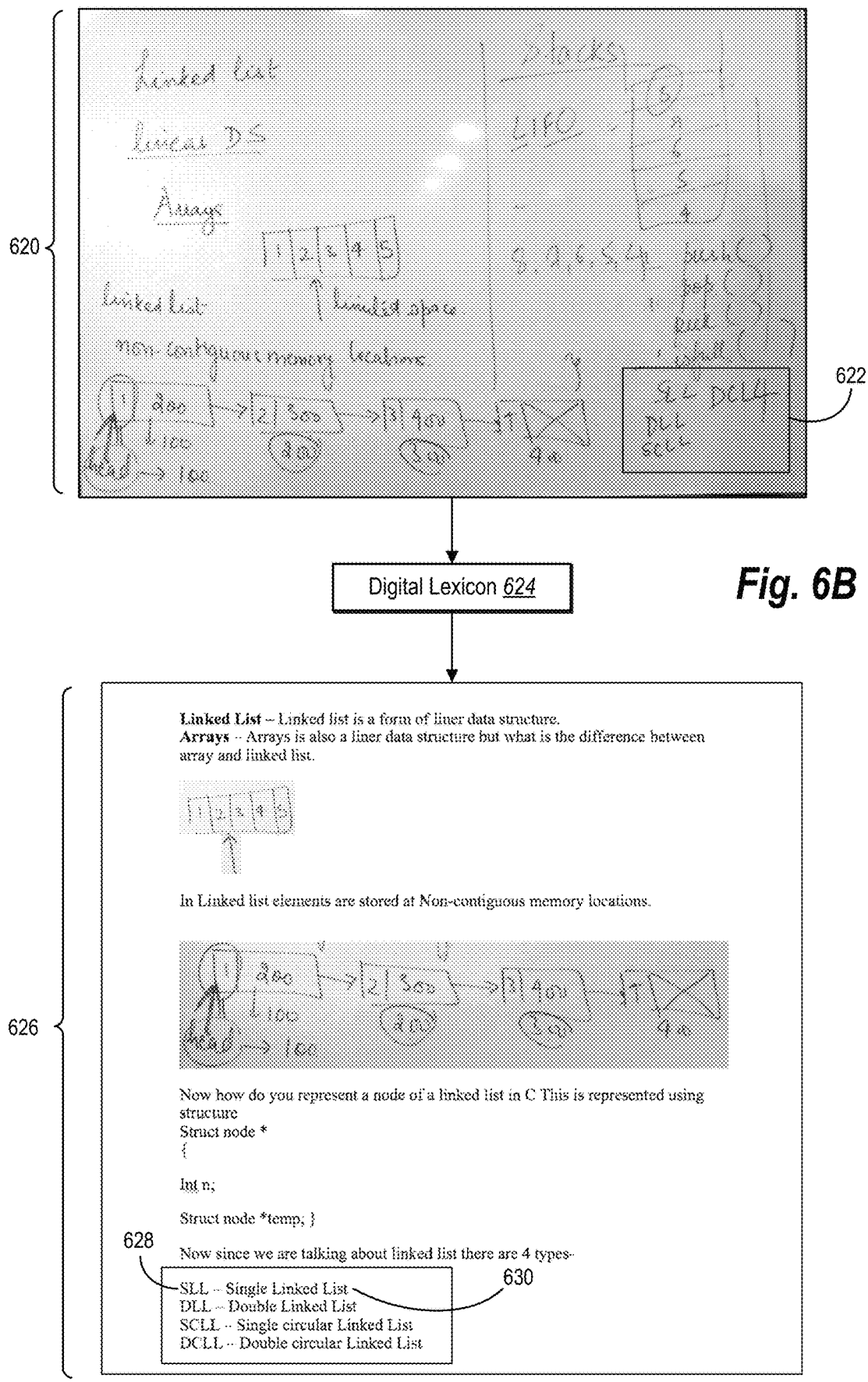

Additionally, as discussed above, a digital summary can include short form text and corresponding long form text. FIG. 6B illustrates determining short form text and corresponding long form text from a digital video and including short form text and corresponding long form text in a digital summary in accordance with one or more embodiments.

As shown in FIG. 6B, the digital summary generation system 114 can identify written short form text from handwritten script 622 from a video frame 620. Short form text can be any abbreviation, acronym, initialism, or any other shortened form of a word or phrase. The digital summary generation system 114 can identify these short forms, determine the long form for the short form based on the audio transcription of the video, and include a listing of the short forms from the writing surface and the long form in the digital summary.

In relation to FIG. 6B, the digital summary generation system 114 determines short form text from handwritten script utilizing an optical character recognition algorithm and a digital lexicon 624. In particular, the digital summary generation system 114 can apply an optical character recognition algorithm to the handwritten script 622 to determine text characters (e.g., "SLL"). The digital summary generation system 114 can compare the text characters (e.g., "SLL") with words in the digital lexicon 624. Based on this comparison, the digital summary generation system 114 determine that the text characters returned from the optical character recognition algorithm (from the handwritten script) are not found in the digital lexicon 624.

Upon determining that the text characters generated from the optical character recognition algorithm are not included in the digital lexicon 624, the digital summary generation system 114 can identify the text characters as (potential) short form text and search for long form text corresponding to the text characters. Specifically, the digital summary generation system 114 can utilize the record of the flow of information to determine the time (e.g., a timestamp) at which the text characters were entered on the writing surface. The digital summary generation system 114 can analyze an audio text transcript based on the timestamp (e.g., at and around the time at which the text characters were entered) to identify spoken words similar to the text characters. In particular, the digital summary generation system 114 can compare the text characters with words in the audio text transcript based on the timestamp to identify long form text corresponding to the text characters.

To identify long form text, the digital summary generation system 114 can compare text characters with the audio text transcript utilizing a variety of approaches. For example, in some embodiments, the digital summary generation system 114 searches clusters of words based on the number of text characters. In particular, the digital summary generation system 114 identifies a cluster of words having the same number of text characters and compares the first letter of each word in the cluster of words with the text characters. If the text characters match the first letter of each word in the cluster of words, the digital summary generation system 114 utilizes the cluster of words as the long form text. The digital summary generation system 114 can utilize a variety of approaches to identify shared characteristics indicating a long form text. As discussed above, the digital summary generation system 114 can utilize a configurable language model to determine similarities between words or phrases. For example, the digital summary generation system can search for shared phonetic sounds, shared letters, or other similarities to identify long form text corresponding to text characters from handwritten script.

Determining short form text and long form text can also be described in terms of a computer-implemented algorithm utilized by the digital summary generation system 114. For example, the digital summary generation system 114 can utilize the following computer-implemented approach:
Algorithm 3
1. Use STT lib to convert from Audio to text
2. While converting, create a map of frame timestamp of each word with its word i.e. map (<timestamp>, <text>). This map is sorted w.r.t timestamp. This map referred to as MP.
3. While running OCR for each video frame, check if OCR returned word is present in localized dictionary. Can use English dictionary but or other dictionary to extent to any locale.
Two cases arise:
1. Word is present in the dictionary: Plainly use this word & Return.
2. Word not present in the dictionary: Follow next steps to check if its valid short form and can be replaced with full form.
4. In the indexed map created in step (2), perform adaptive search for Short form word (say SL) found above as follows:

1. Define length of SL as wl.
2. Move the search pointer in MP corresponding to timestamp of SL
3. Search from this index in both the directions of the sorted map.
4. For each character in SL, check continuous words in (MP) to see if first character of those all words match with all characters of SL.
If yes, return that word
else continue moving index pointer in both directions.

Upon determining that text characters comprise a short form text and determining the corresponding long form text, the digital summary generation system 114 can include the short form text and corresponding long form text in a digital summary. As shown in FIG. 6B, the short form text 628 ("SLL") is an abbreviation of the long form text 630 (Single Linked List"). The long form text 630 was included in the audio text transcript of the digital video at or around the time that the handwritten script ("SLL") was entered onto the writing surface. Utilizing the approach described above, the digital summary generation system 114 identifies "SLL" as short form text 628 and identifies "Single Linked List" in the audio text transcript as the long form text 630. In some embodiments, rather than providing both the short form text 628 and the long form text 630, the digital summary generation system 114 can provide only the long form text 630 (e.g., replace the short form text 628 with the long form text 630).

Figure 7:
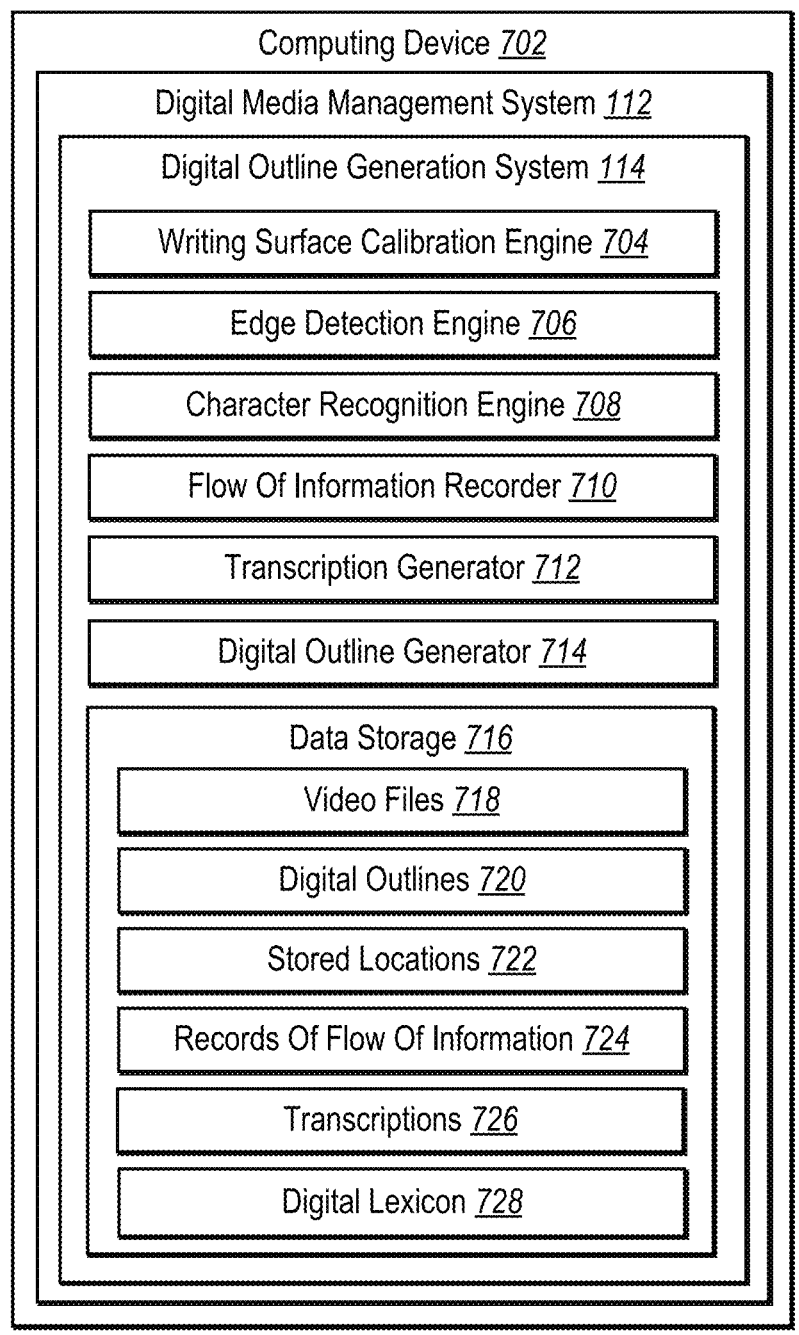
FIG. 7 illustrates a block diagram of a digital summary generation system in accordance with one or more embodiments.

Referring now to FIG. 7, additional detail will be provided regarding capabilities and components of the digital summary generation system 114 in accordance with one or more embodiments. In particular, FIG. 7 shows a schematic diagram of an example architecture of the digital summary generation system 114 hosted on a computing device 702. The digital summary generation system 114 can represent one or more embodiments of the digital summary generation system 114 described previously. As shown, the digital summary generation system 114 is located on a computing device 702 as part of the digital media management system 112, as described above. In general, the computing device 702 may represent various types of computing devices (e.g. the server device(s) 110 or the client device 102).

As illustrated in FIG. 7, the digital summary generation system 114 includes various components for performing the processes and features described herein. For example, the digital summary generation system 114 includes a writing surface calibration engine 704, an edge detection engine 706, a character recognition engine 708, a flow of information recorder 710, a transcription generator 712, and a data storage 716. Each of these components is described below in turn.

As shown in FIG. 7, the digital summary generation system 114 can include a writing surface calibration engine 704. The writing surface calibration engine 704 can identify the writing surface in a digital video, including as a bounded rectangle. In one or more embodiments, the writing surface calibration engine 704 includes a CNN-based neural network. The writing surface calibration engine 704 can also identify and track the movements of other objects in the digital video.

In addition, as illustrated in FIG. 7, the digital summary generation system 114 can include an edge detection engine 706. The edge detection engine 706 can detect and monitor the location and number of edge features in a digital video, and particularly on the writing surface of the digital video. The edge detection engine 706 can decline to count edges from objects separate from the writing surface.

Moreover, as shown in FIG. 7, the digital summary generation system 114 can include a character recognition engine 708. The character recognition engine 708 can detect and recognize handwritten content from a frame of a digital video. Further, the character recognition engine 708 can convert the handwritten text from the frame into digital text. Additionally, the character recognition engine 708 can assign certainty values to various portions of the text that reflects the certainty that the digital text accurately reflects the handwritten content.

Further, as illustrated, the digital summary generation system 114 can include a flow of information recorder 710. The flow of information recorder 710 can identify, record, and categorize any information presented in a digital video. More specifically, the flow of information recorder 710 can determine sections of the digital video based on the timing of information entered onto the writing surface and its proximity to other information on the writing surface (e.g., based on the edge features determined by the edge detection engine 706). Further, the flow of information recorder 710 can determine and record a vector for the flow of information within each section, video frames with content within each section, audio content from the time range corresponding to each section, and the location of corresponding information within transcriptions for both the writing area from that time range and the audio from that time range. Additionally, the flow of information recorder 710 can identify a set of video frames that include the information for the writing surface for the entire digital video.

As illustrated in FIG. 7, the digital summary generation system 114 can include a transcription generator 712. The transcription generator 712 can generate handwritten text transcriptions (from handwritten script on a writing surface portrayed in a digital video) and audio text transcriptions (from digital audio of the digital video). Further, the transcription generator can utilize both the writing surface and the digital audio from a digital video to determine both the transcription of the writing surface and the transcription of the digital audio. Consequently, the transcription generator 712 can generate more accurate transcriptions, even in non-ideal filming conditions.

In addition, as shown, the digital summary generation system 114 can include a digital summary generator 714. The digital summary generator 714 can generate a well-ordered and comprehensive digital summary 204 for the digital video. More specifically, the digital summary generator 714 can utilize the record of the flow of information and its sections to assemble the information from the digital video into an outline including all forms of information from the digital video. That is, the digital summary generator 714 can utilize the record of the flow of information to generate a digital summary including handwritten text transcription, audio text transcripts, diagrams and/or pictures from the writing surface of the digital video, and any other information from the digital video.

As shown in FIG. 7, the digital summary generation system 114 can include data storage 716. The data storage 716 can s tore and/or manage data on behalf of the digital summary generation system 114. The data storage 716 can store any data relevant to the digital summary generation system 114. For example, the data storage 716 can store video files 718, digital summaries 720, stored locations 722, records of flow of information 724, transcriptions 726, and a digital lexicon 728.

FIG. 7 illustrates a schematic diagram of the computing device 702 upon which at least a portion of the digital summary generation system 114 can be implemented in accordance with one or more embodiments. Each of the components 704-728 of the digital summary generation system 114 can include software, hardware, or both. For example, the components 704-728 can include one or more instructions stored on a computer-readable storage medium and executable by processors of one or more computing devices, such as a client device or server device. When executed by the one or more processors, the computer-executable instructions of the digital summary generation system 114 can cause the computing device(s) to perform the methods described herein. Alternatively, the components 704-728 can include hardware, such as a special-purpose processing device to perform a certain function or group of functions. Alternatively, the components 704-728 of the digital summary generation system 114 can include a combination of computer-executable instructions and hardware.

Furthermore, the components 704-728 of the digital summary generation system 114 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 704-728 may be implemented as a stand-alone application, such as a desktop or mobile application. Furthermore, the components 704-728 may be implemented as one or more web-based applications hosted on a remote server. The components 704-728 may also be implemented in a suite of mobile device applications or "apps." To illustrate, the components 704-728 may be implemented in an application, including but not limited to ADOBE® DOCUMENT CLOUD, ADOBE® ACROBAT, or ADOBE® CAPTIVATE®. "ADOBE", "ADOBE DOCUMENT CLOUD", "ADOBE ACROBAT", and "ADOBE CAPTIVATE" are either registered trademarks or trademarks of Adobe Inc. in the United States and/or other countries.

Figure 8:
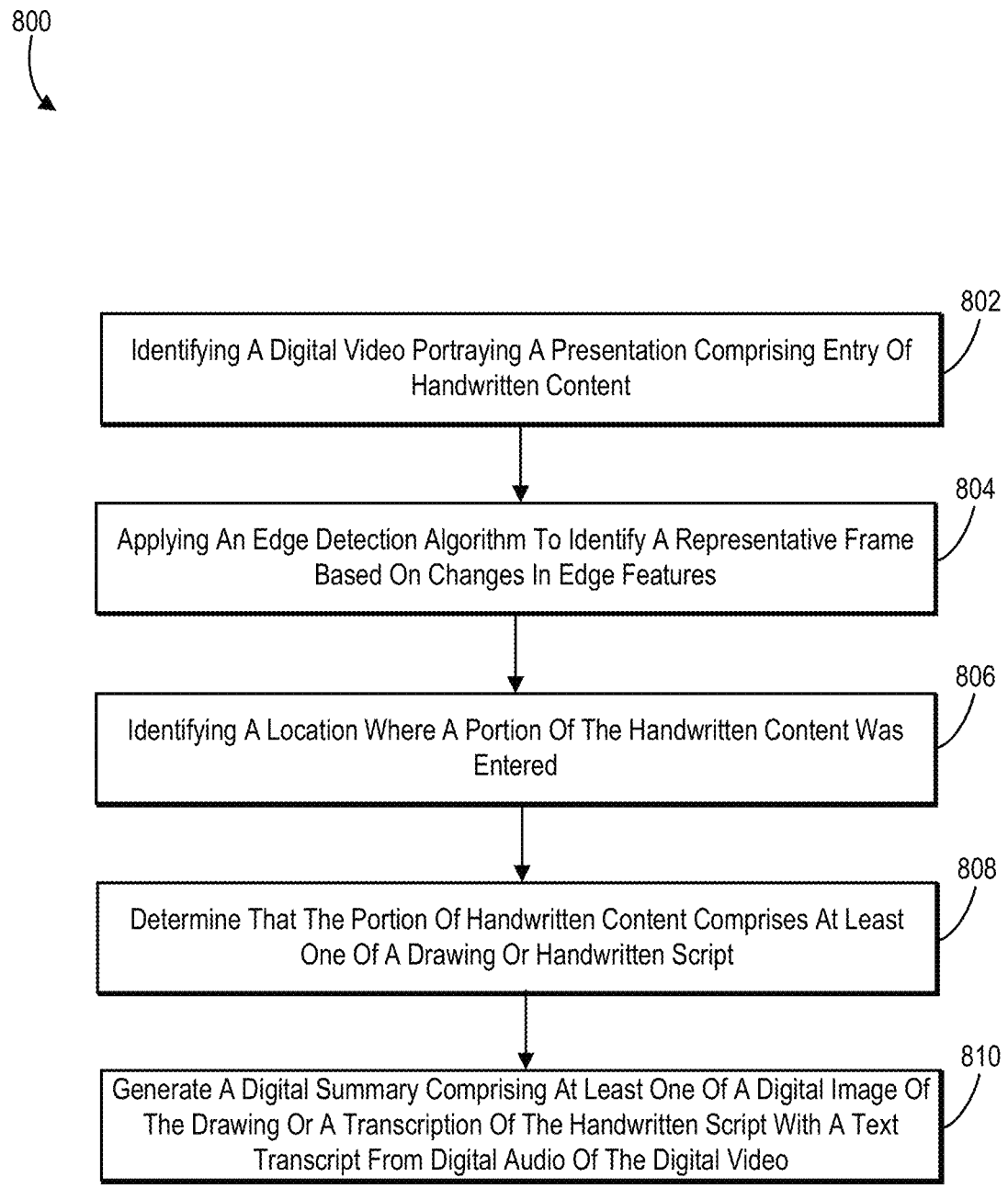
FIG. 8 illustrates a flowchart of a series of acts for generating a digital summary comprising a digital image of a drawing from a writing surface in accordance with one or more embodiments.

FIGS. 1-7, the corresponding text, and the examples provide a number of different methods, systems, devices, and non-transitory computer-readable media of the digital summary generation system 114. In addition to the foregoing, one or more embodiments can also be described in terms of flowcharts comprising acts for accomplishing a particular result, as shown in FIG. 8. In particular, FIG. 8 illustrate a flowchart of a series of acts 800 for generating digital summary in accordance with one or more embodiments. While FIG. 8 illustrates acts according to one embodiment, alternative embodiments may omit, add to, reorder, and/or modify any of the acts shown in FIG. 8. The series of acts 800 can be performed as part of a method. Alternatively, a non-transitory computer-readable medium can comprise instructions that, when executed by one or more processors, cause a computing device to perform the series of acts 800. In some embodiments, a system can perform the series of acts 800.

As illustrated in FIG. 8, the series of acts 800 can include the act 802 of identifying a digital video portraying a presentation comprising entry of handwritten content. For example, the act 802 can include identifying a digital video portraying a presentation comprising user entry of handwritten content on a writing surface over time (wherein the digital video comprises digital audio).

As shown in FIG. 8, the series of acts 800 can also include the act 804 of applying an edge detection algorithm to identify a representative frame based on changes in edge features. For example, the act 804 can include applying an edge detection algorithm to a plurality of frames of the digital video to identify a representative frame for a target time period based on changes in edge features across the plurality of frames. In some embodiments, the act 804 includes applying the edge detection algorithm to a first frame to determine a first number of edge features corresponding to a region of the writing surface; applying the edge detecting algorithm to a second frame to determine a second number of edge features corresponding to the region of the writing surface; and based on comparing the first number of edge features and the second number of edge features to identify the first frame as the representative frame.

The act 804 can also include applying the edge detection algorithm to an additional frame to determine a first number of edge features corresponding to a region of the writing surface; applying the edge detecting algorithm to the frame to determine a second number of edge features corresponding to the region of the writing surface; and based on comparing the first number of edge features and the second number of edge features, add the frame to a set of representative frames of the digital video. In such circumstances, the act 804 can include adding the frame to the set of representative frames base on comparing the first number of edge features and the second number of edge features to identify a decrease in edge features that satisfies a threshold edge feature change.

Moreover, as illustrated in FIG. 8, the series of acts 800 can also include the act 806 of identifying a location where a portion of the handwritten content was entered. For example, the act 806 can include identifying a location of a subpart of the writing surface where a portion of the handwritten content was entered during the target time period. To illustrate, in some embodiments, the act 806 includes applying an edge detection algorithm to a frame of the digital video from a target time period to identify a location of a subpart of the writing surface where a portion of the handwritten content was entered during the target time period.

In addition, the series of acts 800 can also include the act 808 of determining that the portion of handwritten content comprises at least one of a drawing or handwritten script. For example, the act 808 can include utilizing an optical character recognition algorithm, the representative frame, and the location to determine that the portion of the handwritten content comprises at least one of a drawing or handwritten script entered during the target time period.

As shown in FIG. 8, he series of acts 800 can also include the act 810 of generating a digital summary comprising at least one of a digital image of the drawing or a transcription of the handwritten script with a text transcript from digital audio of the digital video. For example, the act 810 can include generating a digital summary comprising at least one of a digital image of the drawing or a transcription of the handwritten script together with a text transcript from digital audio of the digital video for the target time period. For instance, the act 810 can include generating a digital summary of the presentation comprising the transcription of the portion of the handwritten content and the text transcript from the digital audio for the target time period. In some embodiments, the act 810 includes cropping the representative frame based on the location of the subpart of the writing surface where the portion of the handwritten content was entered during the target time period to generate the digital image of the drawing.

The act 810 can include utilizing an optical character recognition algorithm and a text transcript of digital audio for the target time period to generate a transcription of the portion of the handwritten content. In some embodiments, the act 810 can include utilizing the optical character recognition algorithm to generate the transcription of the handwritten script based on the representative frame and the text transcript of the digital audio. In addition, the act 810 can include generating the transcription of the handwritten script by identifying a plurality of words from the text transcript of the digital audio; and providing the plurality of words from the text transcript of the digital audio to an OCR library utilized by the optical character recognition algorithm in generating the transcription of the portion of the handwritten content based on the representative frame.

Moreover, in some embodiments, the act 810 includes generating the transcription of the handwritten script by: utilizing the optical character recognition algorithm to generate a word based on the portion of the handwritten content portrayed in the representative frame; determining a timestamp corresponding to when the portion of the handwritten content was entered; utilizing the timestamp to compare the word to the text transcript of the digital audio to identify a spoken word from the text transcript of the digital audio corresponding to the word; and replacing the word with the spoken word to generate the transcription of the portion of the handwritten content.

The act 810 can also include identifying short form text, from the handwritten script, by comparing the transcription of the handwritten script to a digital lexicon; identifying long form text from the text transcript from the digital audio for the target time period by comparing the short form text with the text transcript; and generating the digital summary of the presentation to include the short form text together with the long form text. Moreover, the act 810 can also include utilizing a machine learning algorithm (e.g., a convolutional neural network and a Kanade-Lucas-Tomasi feature tracker) to identify (e.g., detect and calibrate) the writing surface from the digital video.

In some embodiments the digital video further comprises one or more drawings from a time period of the presentation, and the digital summary further comprises the one or more drawings and a corresponding text transcript of the digital audio from the time period of the digital video. Moreover, in one or more embodiments, the digital summary further comprises short form text from the handwritten content and corresponding long form text not included in the handwritten content. Further, in some embodiments, the digital video of the presentation comprises one or more objects separate from the writing surface, and the digital summary does not comprise the one or more objects separate from the writing surface. The digital video of the presentation can also comprise one or more objects separate from the writing surface, and wherein the digital outline does not comprise the one or more objects separate from the writing surface.

The series of acts 800 can also include applying the edge detection algorithm to an additional frame of the digital video from an additional target time period to identify an additional location of an additional subpart of the writing surface where an additional portion of the handwritten content was entered during the target time period; and utilizing the optical character recognition algorithm to determine that the additional portion of the handwritten content comprises a drawing entered in the additional subpart of the writing surface entered during the additional target time period. For instance, the digital summary can comprise a digital image of the drawing, an additional text transcript from the digital audio of the digital video for the additional target time period, the transcription of the portion of the handwritten content, and the text transcript from the digital audio for the target time period.

The series of acts 800 can also include identifying short form text, from an additional frame of the digital video corresponding to an additional target time period, by comparing a transcription of additional handwritten script from the additional frame to a digital lexicon; and identifying long form text from an additional text transcript from the digital audio for the additional target time period by comparing the short form text with the additional text transcript.

In addition (or in the alternative) to the acts describe above, in some embodiments, the series of acts 800 includes a step for generating transcriptions of portions of the handwritten content based on the digital audio. The methods and acts and algorithms described in relation to FIGS. 3 (e.g., the act 312) and 6A can comprise the corresponding acts and algorithms (e.g., structure) for a step for generating transcriptions of portions of the handwritten content based on the digital audio.

In addition (or in the alternative) to the acts describe above, in some embodiments, the series of acts 800 includes a step for generating a digital summary comprising combinations of the portions of the handwritten content with corresponding text transcripts of the digital audio based on an order of entry of the handwritten content. The methods and acts described in relation to FIGS. 2, 3, 6A, 6B can comprise the corresponding acts and algorithms (e.g., structure) for a step for generating a digital summary comprising combinations of the portions of the handwritten content with corresponding text transcripts of the digital audio based on an order of entry of the handwritten content.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 9:
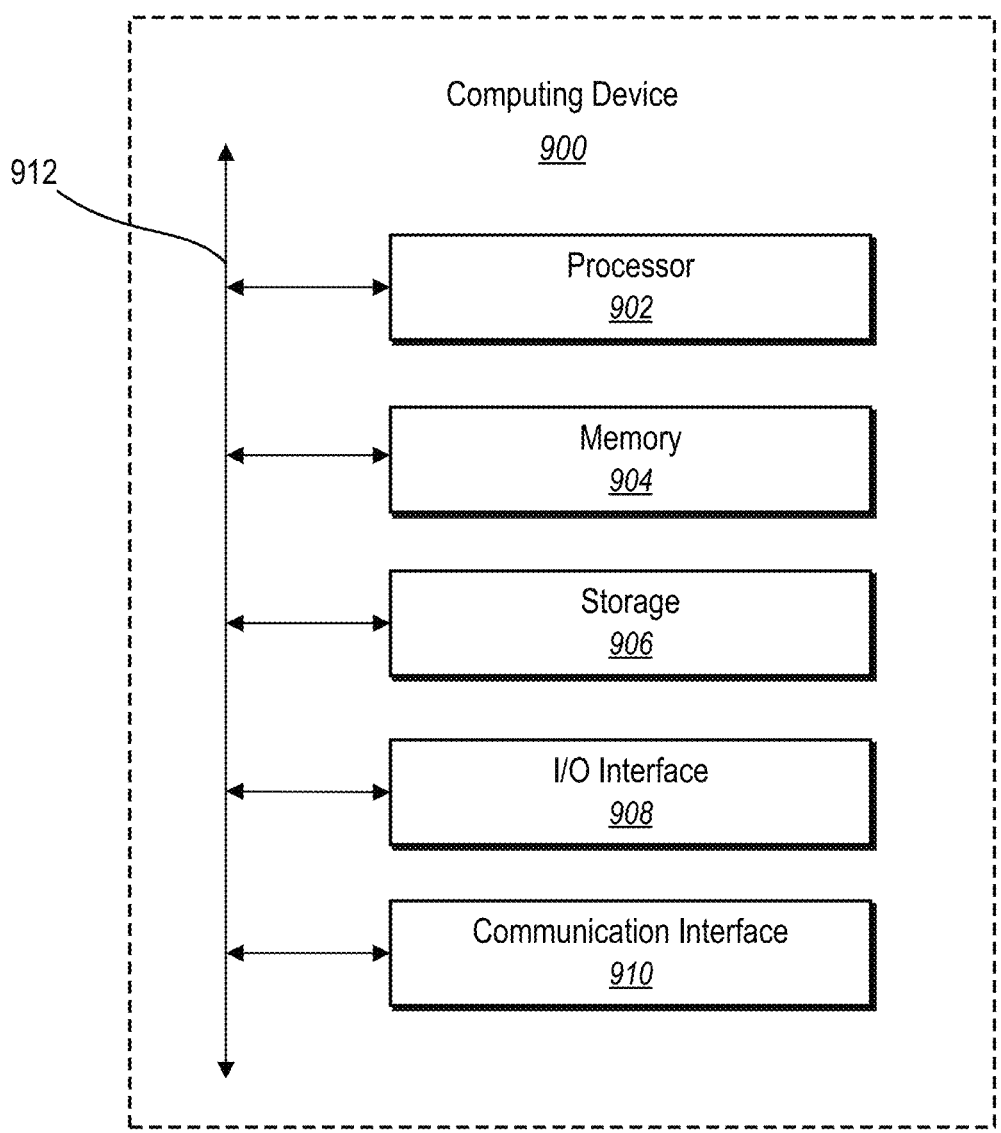
FIG. 9 illustrates a block diagram of an example computing device for implementing one or more embodiments of the present disclosure.

FIG. 9 illustrates a block diagram of an example computing device 900 that may be configured to perform one or more of the processes described above. One will appreciate that one or more computing devices, such as the computing device 900 may represent the computing devices described above (e.g., the computing device 702, the server device(s) 110, and the client device 102). In one or more embodiments, the computing device 900 may be a mobile device (e.g., a mobile telephone, a smartphone, a PDA, a tablet, a laptop, a camera, a tracker, a watch, a wearable device, etc.). In some embodiments, the computing device 900 may be a non-mobile device (e.g., a desktop computer or another type of client device 102). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 for storing data or instructions. As an example, and not by way of limitation, the storage device 906 can include a non-transitory storage medium described above. The storage device 906 may include a hard disk drive (HDD), flash memory, a Universal Serial Bus (USB) drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can include hardware, software, or both that connects components of computing device 900 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium storing instructions that, when executed by at least one processor, cause a computer system to:
- identify a digital video portraying a presentation comprising user entry of handwritten content on a writing surface over time;
- apply an edge detection algorithm to a frame of the digital video from a target time period to identify a location of a subpart of the writing surface where a portion of the handwritten content was entered during the target time period;
- utilize an optical character recognition algorithm and a text transcript of digital audio for the target time period to generate a transcription of the portion of the handwritten content; and
- generate a digital summary of the presentation by processing an order of entry of the handwritten content to combine the portion of the handwritten content with the text transcript of the digital audio for the target time period for presentation within the digital summary.

2. The non-transitory computer readable medium of claim 1, further comprising instructions that, when executed by the at least one processor, cause the computer system to generate the transcription of the portion of the handwritten content by:
- identifying a plurality of words from the text transcript of the digital audio; and
- providing the plurality of words from the text transcript of the digital audio to an OCR library utilized by the optical character recognition algorithm in generating the transcription of the portion of the handwritten content.

3. The non-transitory computer readable medium of claim 1, further comprising instructions that, when executed by the at least one processor, cause the computer system to generate the transcription of the portion of the handwritten content by:
- utilizing the optical character recognition algorithm to generate a word based on the portion of the handwritten content;
- determining a timestamp corresponding to when the portion of the handwritten content was entered;
- utilizing the timestamp to compare the word to the text transcript of the digital audio for the target time period to identify a spoken word from the text transcript of the digital audio corresponding to the word; and
- replacing the word with the spoken word to generate the transcription of the portion of the handwritten content.

4. The non-transitory computer readable medium of claim 1, further comprising instructions that, when executed by the at least one processor, cause the computer system to:
- apply the edge detection algorithm to an additional frame of the digital video from an additional target time period to identify an additional location of an additional subpart of the writing surface where an additional portion of the handwritten content was entered during the target time period; and
- utilize the optical character recognition algorithm to determine that the additional portion of the handwritten content comprises a drawing entered in the additional subpart of the writing surface entered during the additional target time period.

5. The non-transitory computer readable medium of claim 4, further comprising instructions that, when executed by the at least one processor, cause the computer system to generate the digital summary of the presentation such that the digital summary comprises a digital image of the drawing, an additional text transcript from the digital audio of the digital video for the additional target time period, the transcription of the portion of the handwritten content, and the text transcript from the digital audio for the target time period.

6. The non-transitory computer readable medium of claim 1, further comprising instructions that, when executed by the at least one processor, cause the computer system to:
- apply the edge detection algorithm to an additional frame to determine a first number of edge features corresponding to a region of the writing surface;
- apply the edge detecting algorithm to the frame to determine a second number of edge features corresponding to the region of the writing surface; and
- based on comparing the first number of edge features and the second number of edge features, add the frame to a set of representative frames of the digital video.

7. The non-transitory computer readable medium of claim 6, further comprising instructions that, when executed by the at least one processor, cause the computer system to add the frame to the set of representative frames base on comparing the first number of edge features and the second number of edge features to identify a decrease in edge features that satisfies a threshold edge feature change.

8. The non-transitory computer readable medium of claim 6, further comprising instructions that, when executed by the at least one processor, cause the computer system to utilize a machine learning model to calibrate the writing surface from the digital video.

9. The non-transitory computer readable medium of claim 1, further comprising instructions that, when executed by the at least one processor, cause the computer system to:
- identify short form text, from an additional frame of the digital video corresponding to an additional target time period, by comparing a transcription of additional handwritten script from the additional frame to a digital lexicon; and
- identify long form text from an additional text transcript from the digital audio for the additional target time period by comparing the short form text with the additional text transcript.

10. A system comprising:
- at least one processor; and
- at least one non-transitory computer readable storage medium storing instructions thereon that, when executed by the at least one processor, cause the system to:
  - identify a digital video portraying a presentation comprising user entry of handwritten content on a writing surface over time;
  - apply an edge detection algorithm to a plurality of frames of the digital video to identify a representative frame for a target time period based on changes in edge features across the plurality of frames;
  - identify a location of a subpart of the writing surface where a portion of the handwritten content was entered during the target time period;
  - utilize an optical character recognition algorithm, the representative frame, and the location to determine that the portion of the handwritten content comprises at least one of a drawing or handwritten script entered during the target time period; and
  - generate a digital summary of the presentation by processing an order of entry of the handwritten content to combine the portion of the handwritten content with a text transcript of the digital audio for the target time period for presentation within the digital summary.

11. The system of claim 10, further comprising instructions that, when executed by the at least one processor, cause the system to generate the digital summary comprising a digital image of the drawing by cropping the representative frame based on the location of the subpart of the writing surface where the portion of the handwritten content was entered during the target time period to generate the digital image of the drawing.

12. The system of claim 10, further comprising instructions that, when executed by the at least one processor, cause the system to:
generate the digital summary comprising at least one of a digital image of the drawing or a transcription of the handwritten script together with a text transcript from digital audio of the digital video for the target time period; and
utilize the optical character recognition algorithm to generate the transcription of the handwritten script based on the representative frame and the text transcript of the digital audio.

13. The system of claim 12, further comprising instructions that, when executed by the at least one processor, cause the system to generate the transcription of the handwritten script by:
identifying a plurality of words from the text transcript of the digital audio; and
providing the plurality of words from the text transcript of the digital audio to an OCR library utilized by the optical character recognition algorithm in generating the transcription of the portion of the handwritten content based on the representative frame.

14. The system of claim 12, further comprising instructions that, when executed by the at least one processor, cause the system to generate the transcription of the handwritten script by:
utilizing the optical character recognition algorithm to generate a word based on the portion of the handwritten content portrayed in the representative frame;
determining a timestamp corresponding to when the portion of the handwritten content was entered;
utilizing the timestamp to compare the word to the text transcript of the digital audio to identify a spoken word from the text transcript of the digital audio corresponding to the word; and
replacing the word with the spoken word to generate the transcription of the portion of the handwritten content.

15. The system of claim 12, further comprising instructions that, when executed by the at least one processor, further cause the system to:
identify short form text, from the handwritten script, by comparing the transcription of the handwritten script to a digital lexicon;
identify long form text from the text transcript from the digital audio for the target time period by comparing the short form text with the text transcript; and
generate the digital summary of the presentation to include the short form text together with the long form text.

16. The system of claim 10, further comprising instructions that, when executed by the at least one processor, further cause the system to identify the representative frame by:
applying the edge detection algorithm to a first frame to determine a first number of edge features corresponding to a region of the writing surface;
applying the edge detecting algorithm to a second frame to determine a second number of edge features corresponding to the region of the writing surface; and
based on comparing the first number of edge features and the second number of edge features to identify the first frame as the representative frame.

17. A computer-implemented method comprising:
identifying a digital video portraying a presentation comprising user entry of handwritten content on a writing surface over time, wherein the digital video comprises digital audio of the presentation;
applying an edge detection algorithm to a frame of the digital video from a target time period to identify a location of a subpart of the writing surface where a portion of the handwritten content was entered during the target time period;
utilizing an optical character recognition algorithm and a text transcript of the digital audio for the target time period to generate a transcription of the portion of the handwritten content; and
generating a digital summary by processing an order of entry of the handwritten content to combine the portion of the handwritten content with the text transcript of the digital audio for the target time period for presentation in the digital summary.

18. The computer-implemented method of claim 17, wherein: the digital video further comprises one or more drawings from a time period of the presentation, and wherein the digital summary further comprises the one or more drawings and a corresponding text transcript of the digital audio from the time period of the digital video.

19. The computer-implemented method of claim 17, wherein the digital summary further comprises short form text from the handwritten content and corresponding long form text not included in the handwritten content.

20. The computer-implemented method of claim 17, wherein the digital video of the presentation comprises one or more objects separate from the writing surface, and wherein the digital summary does not comprise the one or more objects separate from the writing surface.

* * * * *